(12) United States Patent
Mininni et al.

(10) Patent No.: US 7,665,349 B2
(45) Date of Patent: Feb. 23, 2010

(54) METHOD AND APPARATUS FOR RAPID AUTOMATIC ENGAGEMENT OF A PROBE

(75) Inventors: Paul I. Mininni, Montreal (CA); Jason R. Osborne, Lompoc, CA (US); James M. Young, Santa Barbara, CA (US); Charles R. Meyer, Santa Barbara, CA (US)

(73) Assignee: Veeco Instruments Inc., Plainview, NY (US)

( * ) Notice: Subject to any disclaimer, the term of this patent is extended or adjusted under 35 U.S.C. 154(b) by 115 days.

(21) Appl. No.: 11/132,959

(22) Filed: May 19, 2005

(65) Prior Publication Data

US 2006/0230474 A1    Oct. 12, 2006

Related U.S. Application Data

(63) Continuation of application No. 11/104,283, filed on Apr. 12, 2005, now abandoned.

(51) Int. Cl.
*G01Q 10/00* (2010.01)
*G01Q 60/24* (2010.01)

(52) U.S. Cl. ...................................................... 73/105
(58) Field of Classification Search .................... 73/105
See application file for complete search history.

(56) References Cited

U.S. PATENT DOCUMENTS

| | | | | |
|---|---|---|---|---|
| 3,577,918 | A * | 5/1971 | Wayfield | 101/328 |
| 4,343,993 | A | 8/1982 | Binnig | |
| 5,066,858 | A * | 11/1991 | Elings et al. | 250/307 |
| 5,260,572 | A * | 11/1993 | Marshall | 250/306 |
| 5,266,801 | A | 11/1993 | Elings et al. | |
| RE34,489 | E | 12/1993 | Hansma et al. | |
| 5,412,980 | A | 5/1995 | Elings et al. | |
| 5,614,712 | A | 3/1997 | Ray | |

(Continued)

FOREIGN PATENT DOCUMENTS

JP    10311841    11/1998

OTHER PUBLICATIONS

"What is metrology", http://www.bipm.org/en/convention/wmd/2004/.*

*Primary Examiner*—Daniel S Larkin
(74) *Attorney, Agent, or Firm*—Boyle Fredrickson S.C.

(57) ABSTRACT

A method and apparatus of engaging a probe with a sample surface including automatically reducing the spacing between a probe of a probe based instrument and a sample from an initial separation to one in which the probe is positioned for obtaining a sample surface measurement in less than ten seconds without damaging either the probe or the sample. The method includes oscillating the probe, measuring at least one parameter of probe oscillation and then engaging the probe and the sample by generally continuously controlling the reducing step based on the measuring step to reduce the separation from an initial separation to an engage position. In addition to feeding back directly on the tip-sample interaction, a direct communication line is provided between the processor used to generate control signals that govern the engage and a conventional motion controller. In an alternative, a coarse positioning actuator and a fine positioning actuator in which the control of both is coordinated under feedback to place the probe in the engaged position, and wherein the close approach phase of the algorithm is controlled by a dedicated real time controller.

36 Claims, 11 Drawing Sheets

U.S. PATENT DOCUMENTS

| | | |
|---|---|---|
| 5,773,824 A | 6/1998 | Flecha et al. |
| 5,852,232 A * | 12/1998 | Samsavar et al. ............. 73/105 |
| 5,945,671 A * | 8/1999 | Yasutake .................... 250/306 |
| 6,265,718 B1 * | 7/2001 | Park et al. .................... 250/307 |
| 6,593,571 B1 * | 7/2003 | Yasutake .................... 250/306 |
| 6,672,144 B2 * | 1/2004 | Adderton et al. .............. 73/105 |
| 6,960,765 B2 * | 11/2005 | Tomimatsu et al. ......... 250/307 |

* cited by examiner

METHOD AND APPARATUS FOR RAPID AUTOMATIC ENGAGEMENT OF A PROBE

CROSS REFERENCE TO RELATED APPLICATION

This application is a continuation of U.S. patent application Ser. No. 11/104,283, filed on Apr. 12, 2005, now abandoned the entirety of which is expressly incorporated by reference herein.

BACKGROUND OF THE INVENTION

1. Field of the Invention

The present invention is directed to metrology instruments employing a probe and, more particularly, relates to a method and apparatus for automatically and rapidly driving a probe of such an instrument into engagement with a sample.

2. Description of Related Art

Several probe-based instruments monitor the interaction between a probe and a sample to obtain information concerning one or more characteristics of the sample. For example, scanning probe microscopes (SPMs) typically characterize the surface of a sample down to atomic dimensions by monitoring the interaction between the sample and a tip on the cantilever probe. By providing relative scanning movement between the probe and the sample, surface characteristic data can be acquired over a particular region of the sample, and a corresponding map of the sample can be generated.

The atomic force microscope (AFM) is a very popular type of SPM. The probe of the typical AFM includes a very small cantilever which is fixed to a support at its base and which has a sharp probe tip attached to the opposite, free end. The probe tip is brought very near to or into contact with a surface of a sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as strain gauges, capacitance sensors, etc. The probe is scanned over a surface using a high-resolution three axis scanner acting on the sample support and/or the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

AFMs may be designed to operate in a variety of modes, including contact mode and oscillating mode. In contact mode operation, the microscope typically scans the tip across the surface of the sample while keeping the force of the tip on the surface of the sample generally constant. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography. Alternatively, some AFMs can at least selectively operate in an oscillation mode of operation such as TappingMode™. In TappingMode™ the tip is oscillated at or near a resonant frequency of the cantilever of the probe. The amplitude or phase of this oscillation is kept constant during scanning using feedback signals, which are generated in response to tip-sample interaction. As in contact mode, these feedback signals are then collected, stored, and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

One potentially problematic characteristic of SPMs (including AFMs) and other probe-based instruments lies in the technique employed to initially cause the probe to approach its "engaged" position. An engaged position is one in which the probe is located sufficiently close to the sample surface to obtain the desired measurement. This position varies with the characteristics of the instrument, the instrument's mode of operation, the sample, and the measurement being taken. The probe may be placed in this position by moving the probe toward the sample, the sample toward the probe, or a combination of both.

Because the probes are fragile, some amount of care is required to successfully engage a probe to the sample'surface. Typically, the operator starts with a large initial separation between the probe and sample to ensure that the probe and sample are not damaged when either needs to be exchanged. This initial separation is often several mm or greater, but may be as small as 25-50 um, depending on the system configuration, skill level and risk tolerance of the operator. From this initial separation, the operator typically manually reduces the probe-sample distance, often with the aid of an optical microscope to visually monitor the separation. The operator will typically position the tip to a secondary separation which is perhaps 20-1000 um from the surface, from which point an automatic engage algorithm is used for the final approach. This manual positioning step is time consuming and can be difficult for some operators. In many cases, depending on the skill of the operator and the configuration of the SPM, the manual positioning step can take several seconds to several minutes. Alternately, some systems use an external metrology device, such as an interferometer. Both systems are inexact and thus must allow for some margin of error, obviously leading to potentially longer engage times to accommodate the error.

From the secondary separation, the operator typically initiates an automatic engage algorithm which operates until the probe is engaged on the sample surface. During the automatic engage process, the system typically monitors one or more SPM feedback properties (for example, cantilever deflection or amplitude) for evidence of probe/sample interaction.

For the case in which the secondary separation is large such as 1000 microns, known automatic engage algorithms take a substantial amount of time to achieve the engaged position. Therefore, some techniques attempt to limit this final automatic engage movement to about 100 microns, and may be as little as 20 microns if sample clearance can be very closely controlled. The manual work required to achieve such secondary distances, however, typically offsets the benefits achieved with automatic engage times. A representative example of this operation is disclosed in U.S. Pat. No. 4,343,993 to Binnig, which is entitled "Scanning Tunneling Microscope" and the subject matter of which is disclosed herein by reference.

It is desirable to perform the entire engage process automatically and as quickly as possible. This goal is not easily met, however, because actuator precision and speed are, generally speaking, inversely related. Hence, a highly responsive, relatively low speed actuator is not well suited for rapidly closing the gap during the initial or "fast engage" phase of the engage process course. It also might not have sufficient range. More particularly, lack of range is one key reason for using two actuators. The Z piezo stage is actually capable of higher speeds than the SPM stage, but the SPM stage has about a 15,000 um range, while the Z Piezo Stage only has about a 8-16 um range (some manufacturers offer 50 um range Z Piezo scanners, but this is still too small). On the other hand, a less dynamically responsive, relatively high speed actuator that is capable of closing the probe/sample gap rapidly might not have sufficient smoothness/precision of motion to prevent the probe from slamming into the sample and damaging the probe and/or sample. For instance, if the Z-axis actuator diminishes probe/sample separation in insufficiently small increments, the approach may not be stopped before probe and/or sample are damaged by excessive interaction.

A proposed solution to this problem is disclosed U.S. Pat. No. 5,614,712, which is assigned to David J. Ray. The Ray patent introduces automatic coarse and fine position controls to a two-stage Z actuator. Referring to FIG. 1, the actuator 2 includes both a coarse positioning actuator 4, such as a stepper motor, and a fine positioning actuator 6, such as a piezoelectric actuator. The fine positioning actuator 6 is mounted on the coarse positioning actuator 4, and a probe 8 is mounted on the fine positioning actuator 6. Referring to FIG. 2, once tip-sample separation is blindly reduced a selected amount from a large distance (about 1000 microns) to a safe separation (about 100 microns, for example), the fine positioning actuator 6 is first extended to diminish the spacing between the probe 8 and the sample S while checking for probe/surface interaction indicative of engagement (compare position B to position A). If the fine positioning actuator extends through its full range without detecting the sample surface, it is retracted, as seen by comparing positions C and D with position B. The coarse positioning actuator 4 is then extended, typically incrementally, as seen in position A', and the fine positioning actuator 6 is again extended while checking for probe/surface interaction indicative of engagement, as understood by those skilled in the AFM art. This "sewing" process is repeated as required until the fine positioning actuator drives the probe 8 into its engaged position as seen in position B'.

Engagement is thus constrained to occur during motion of the fine positioning actuator 6. This process is effective and automatic, but is relatively time consuming, often taking one minute or more to complete due in part to the fact that it requires extension and retraction of the fine positioning actuator with each incremental movement of the coarse positioning actuator. These slow engage speeds are tedious for all applications and unacceptable in applications in which a large number of measurements must be obtained as rapidly as possible. For instance, in many industrial applications employing step-and-repeat operations (semiconductor analysis, etc.), waiting for the probe to repeatedly re-engage can cut throughput in half or more.

Another two-stage actuator is disclosed in Japanese Patent No. 10311841 to IBM. The two-stage actuator disclosed in the Japanese IBM patent also has a coarse positioning actuator and a fine positioning actuator. However, unlike with the system disclosed in the Ray patent, transition between first and second stages is justified based on the difference in speeds of response rather than on the accuracy of positioning of the two stages. Hence, the engagement is constrained to occur during motion of a stage that has a relatively high-speed response but a limited range. As such, there is a greater risk that the tip and/or sample becomes damaged during the engage operation.

In all these systems the user is moving blindly through a selected distance in a continuous coarse positioning step. As a result, a system able to sense actual tip-sample separation would be ideal insofar as the continuous step could be used to move the initial tip-sample separation to a closer, yet still safe, separation.

In this regard, another limitation with known systems is that conventional SPM control architecture most often uses the host software to control the engage process. The host exists within the framework of the PC's operating system and therefore can be highly non-deterministic. Generally, during the engage process, the host alternates between sending commands to the SPM motion controller and the digital signal processor of the SPM over a PCI bus. Due to PCI bus latencies, it is not possible for the host to exercise real time control over the engage process, and therefore many of the actions have to be performed serially with added delays to accommodate these latencies. Possibly more importantly, prior to engage, known systems require the user to focus the corresponding optics of the SPM on the back of the probe, move the optics objective lens down by the desired probe-sample separation distance (e.g., 1000 microns), and then focus on the sample. In this case, notwithstanding the time required for each step, if either of these focal positions is off by more than more than a few tens of microns, the probe may be damaged.

Finally, as noted above, it is important to note that it is possible for the user to manually reduce the initial tip-sample separation to a secondary distance of less than 20 microns, and possibly even less than 10 microns, prior to performing the automatic portion of the engage process using, for example, one of the above-described methods. Such manual reduction may be performed once the probe is mounted in the AFM head, for example, by viewing the probe and sample as the two are brought into close range. From such safe distances, automatic engage times can be greatly reduced as compared to conventional methods. However, the relevant time in this case is the entire time required to bring the probe from the initial separation to the engaged position. In this case, it includes both the manual positioning step and the automatic engage time. For high throughput applications, the time and user intervention required to perform such a manual operation is prohibitive.

The need has therefore arisen to provide a feedback-controlled probe/surface engage of a probe-based instrument that is nondestructive to both the probe and the sample, automatic, and rapid, with generally no manual adjustment of the tip-sample separation (e.g., to a "safe" distance), to allow users to realize significant improvement in overall throughput. More specifically, a need exists to decrease AFM engage time from initial tip-sample separations (for example, exceeding 20 microns and preferably distances at or greater than 1 mm) from the current 15 to 25 seconds to less than three seconds while preserving probe/sample integrity, especially for sub-50 nm probes including critical dimension (CD) and focused ion beam (FIB) probes.

SUMMARY OF THE INVENTION

A preferred embodiment of the invention overcomes the above-noted drawbacks using unique control architecture which continuously monitors probe-sample separation based on probe-sample interaction to reduce engage times from more than 10 seconds to less than 5 seconds. In particular, the center of the engage control resides with a system processor (e.g., a DSP of a host computer) which communicates information regarding probe-sample interaction in parallel with other AFM instructions, and minimal processing by the host software. As a result, control signals based on probe-sample interaction can be transmitted to a motion controller in substantially real-time.

According to one aspect of the preferred embodiment, a method of engaging a probe with a sample surface includes automatically reducing the spacing between a probe of a probe-based instrument and a sample from an initial separation to one in which the probe is positioned for obtaining a sample surface measurement in less than ten (10) seconds. Preferably, the engage is performed in three (3) seconds or less.

In another aspect of this embodiment, the method of engaging a probe with a sample surface includes oscillating the probe, and then measuring at least one parameter of probe oscillation. The method also engages the probe and the sample by generally continuously controlling the reducing step based on the measuring step to reduce the separation from an initial separation to then engage position.

According to another aspect of this preferred embodiment, the reducing step includes a first reducing step and a second reducing step, wherein the first reducing step is performed at a higher speed than the second reducing step. In addition, the first reducing step generally continuously reduces the separation. Moreover, the method preferably further includes the step of decelerating a speed of the first reducing step in response to the output of the measuring step meeting a trigger threshold.

In yet another aspect of this preferred embodiment, the trigger threshold corresponds to a percentage of the parameter corresponding to the probe oscillating in free air. Also, the decelerating step is performed in response to a plurality of trigger thresholds each corresponding to a selected percentage of the parameter of the probe oscillating in free air, where each threshold corresponds to an associated amount of deceleration.

According to another aspect of this preferred embodiment, one of the trigger thresholds is an SPM stop threshold, and includes the step of stopping the first reducing step when the output of the measuring step meets the stop threshold. Preferably, the stop in this continuous mode is not a hard stop.

According to another aspect of this preferred embodiment, the first reducing step includes using an actuator responsive to the decelerating step. Preferably, the actuator is a linear actuator, and may be an SPM servo motor that drives a screw and nut arrangement. The first reducing step is performed at a speed greater than about 600 microns per second, with about 650 um/second being the most robust. The method further includes the steps of generating an error signal in response to the measuring step, processing the error signal to generate a control signal and directly communicating the control signal to a motion controller coupled to the actuator. Preferably, the processor of the host computer generates the control signal which is communicated directly to the motion controller.

According to another aspect of this preferred embodiment, the second reducing step reduces the separation in one or more discrete steps and includes stepping a linear actuator and thereafter moving a piezoelectric Z-axis actuator. The linear actuator is preferably a servo motor coupled to a screw and nut arrangement.

According to another aspect of this preferred embodiment, the Z-axis actuator is retracted after each step of stepping the linear actuator, while the moving step includes extending the Z-axis actuator. During the extending step, the controlling step includes using a feedback loop to generate a control signal based on the measuring step, and the control signal is used to control the extending step. Preferably, the extending and the stepping steps are repeated until either the Z-axis actuator is fully extended, or the parameter of oscillation substantially corresponds to a setpoint.

In another aspect of this preferred embodiment, the stepping the linear actuator step includes stepping the linear actuator more than 2 microns, but preferably about 4 microns.

According to another aspect of this preferred embodiment, the feedback loop generates an error signal in response to the measuring step. Preferably, applying a gain to the error signal to generate the control signal by an adaptive gain stage that varies the gain based on the error signal.

According to another aspect of this preferred embodiment, the automatically reducing step is performed in about 3 seconds.

According to another aspect of the preferred embodiment, an apparatus to engage a probe with a sample surface includes an actuator to provide relative motion between the probe and the sample and a controller to control the actuator to cause the probe to initially engage the sample from an initial probe/sample separation (about 1 mm) in less than ten (10) seconds.

In another aspect of the preferred embodiment, the actuator includes a first actuator controlled by a motion controller substantially continuously based on an error signal. The actuator generally continuously reduces the separation from an initial separation to a step mode separation in a Continuous Mode. The actuator also includes a second actuator that is controlled by an SPM controller as well as a feedback loop that generates an error signal based on interaction between the probe and the sample. In response to the error signal, a control signal is communicated to the motion controller via a dedicated communication line.

According to another embodiment, a coarse positioning actuator and a fine positioning actuator of a two-stage actuator of a probe-based instrument that are controlled to cause the probe to engage the sample in less than five seconds, and more preferably, less than three seconds, without damaging either the probe or the sample. In a preferred process, this goal is achieved in a two phase process including a fast approach phase in which the coarse positioning actuator is driven, preferably without feedback, and a close approach phase, in which control of the coarse positioning actuator and fine positioning actuator is coordinated under feedback control to place the probe in the engaged position as rapidly as possible. The fast approach phase ends when the probe/sample spacing has been diminished to a safe distance $I_S$ from the sample surface.

The close approach phase may begin with reduced speed actuation of the coarse positioning actuator, preferably while the fine positioning actuator is fully extended, to diminish the probe/sample spacing while relying on feedback from the fine positioning actuator to check for probe proximity to the sample surface. Then, upon determining that the probe is in the vicinity of the sample surface or at a "the braking setpoint" $B_S$, the coarse positioning actuator is shut down while the fine positioning actuator is retracted to prevent damage to the tip or sample. Then, the fine positioning actuator is controlled under feedback to perform the engagement function by placing the probe at a position relative to the sample corresponding to an operating setpoint $O_S$.

By precluding the possibility of probe/surface interaction during the fast approach phase, the approach velocity is constrained only by the operational capability of the coarse positioning actuator. Overall engage time is thus minimized without compromising the ability of the system to halt the approach within the range $I_S$. The positioning speed capabilities of typical feedback controlled probe/sample interaction devices are sufficient during the subsequent close approach phase to guarantee engagement in five seconds from process initialization.

In another key aspect of the invention, the AFM's digital signal processor (DSP) is given control of the engage process, whereby a direct communication link exists between the DSP and the motion controller of the SPM. Notably, the DSP also monitors the RMS amplitude of probe oscillation in real time as the probe approaches the sample. Therefore, because there is a dependence between RMS amplitude and probe-sample separation, the DSP is able to detect RMS amplitude changes and issue control commands for the engage process much quicker than conventional systems thus preserving probe damage during the engage process.

According to a first aspect of the preferred embodiment, a method of engaging a probe of, for example, an AFM, with a sample includes automatically driving an actuator to reduce the spacing between the probe of the AFM and the sample from a maximum to one in which the probe is positioned for obtaining a sample surface measurement in less than 30 seconds. Notably, the method accomplishes the engage without damaging either the probe or the sample.

According to another aspect of this preferred embodiment, the method further includes the step of driving a coarse positioning actuator to position the probe a distance above the sample surface at which no probe/surface interaction takes place. The method also includes coordinating operation of the coarse positioning actuator and a fine positioning actuator to place the probe at about the surface measurement spacing corresponding to an operating setpoint.

In another aspect of this embodiment, the method includes the step of driving the coarse positioning actuator at a greater speed than the fine positioning actuator.

According to a still further aspect of the preferred embodiment, the coordinating step is performed by a dedicated real-time controller.

According to yet another aspect of the preferred embodiment, the method includes driving the coarse positioning actuator at reduced speed with the fine positioning actuator fully extended while checking for probe/surface interaction and then, retracting the fine positioning actuator. Preferably simultaneously with this retraction, the method shuts off the coarse positioning actuator.

In a still further aspect of this embodiment, the method further includes the step of retracting the fine positioning actuator upon detecting a braking setpoint of probe/sample interaction.

In yet another aspect of this preferred embodiment, the method further includes triggering the shutting off step with a kill setpoint, where the kill setpoint is based on an inertial characteristic of the coarse positioning actuator and corresponds to a predetermined drive voltage of the fine positioning actuator.

In an even further aspect of this preferred embodiment, the driving step is performed in less than 15 seconds, and preferably, less than 5 seconds.

According to yet another aspect of this preferred embodiment, the distance $I_S$ for an SPM operating in an oscillating mode is about 20 µm, and the operating setpoint corresponds to a probe oscillation amplitude of about 75-85% of a free air oscillation of the probe.

According to another aspect of the preferred embodiment, an apparatus to engage a probe with a sample surface includes an actuator to provide relative motion between the probe and the sample. The apparatus also includes a controller to control the actuator to cause the probe to initially engage the sample from a maximum probe/sample separation in less than 30 seconds with substantially no chance of damaging either the probe or the sample due to the initial engagement.

According to an even further aspect of the preferred embodiment, the engagement occurs in less than 15 seconds, and preferably, less than 5 seconds.

According to yet another aspect of this preferred embodiment, the actuator includes a coarse positioning actuator and a fine positioning actuator. The coarse positioning actuator provides a greater range of motion which is taken advantage of by operating it at a speed of motion greater than the speed of motion provided by the fine positioning actuator, which is possible given the greater tip-sample separation at which the coarse positioning actuator is operated.

In an even still further aspect of this preferred embodiment, the controller includes a non real-time control system and a real time control system, where control switches from the non real-time control system to the real-time control system after the coarse positioning actuator moves the probe a predetermined distance at a first speed. Also, when control switches, the coarse positioning actuator is operated at a second speed less than the first speed.

According to another aspect of the preferred embodiment, the fine positioning actuator retracts the probe when the detector senses probe/sample surface interaction.

According to even yet another aspect of the preferred embodiment, the controller coordinates operation of coarse and fine positioning actuators to position the probe at about a probe-sample spacing corresponding to an operating setpoint. Preferably, the operating setpoint is about 75-85% of a free air oscillation amplitude when the probe is operated in an oscillating mode.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF PREFERRED EMBODIMENTS

The invention as described herein is applicable to virtually any probe based instrument in which the probe/sample spacing must be reduced prior to obtaining sample characteristic measurements. These instruments include SPMs such as AFMs, tunneling force microscopes, and lateral force microscopes. Hence, while the invention will be described primarily in conjunction AFMs by way of example, it is to be understood that it is applicable to many other probe based instruments is well.

Figure 3:
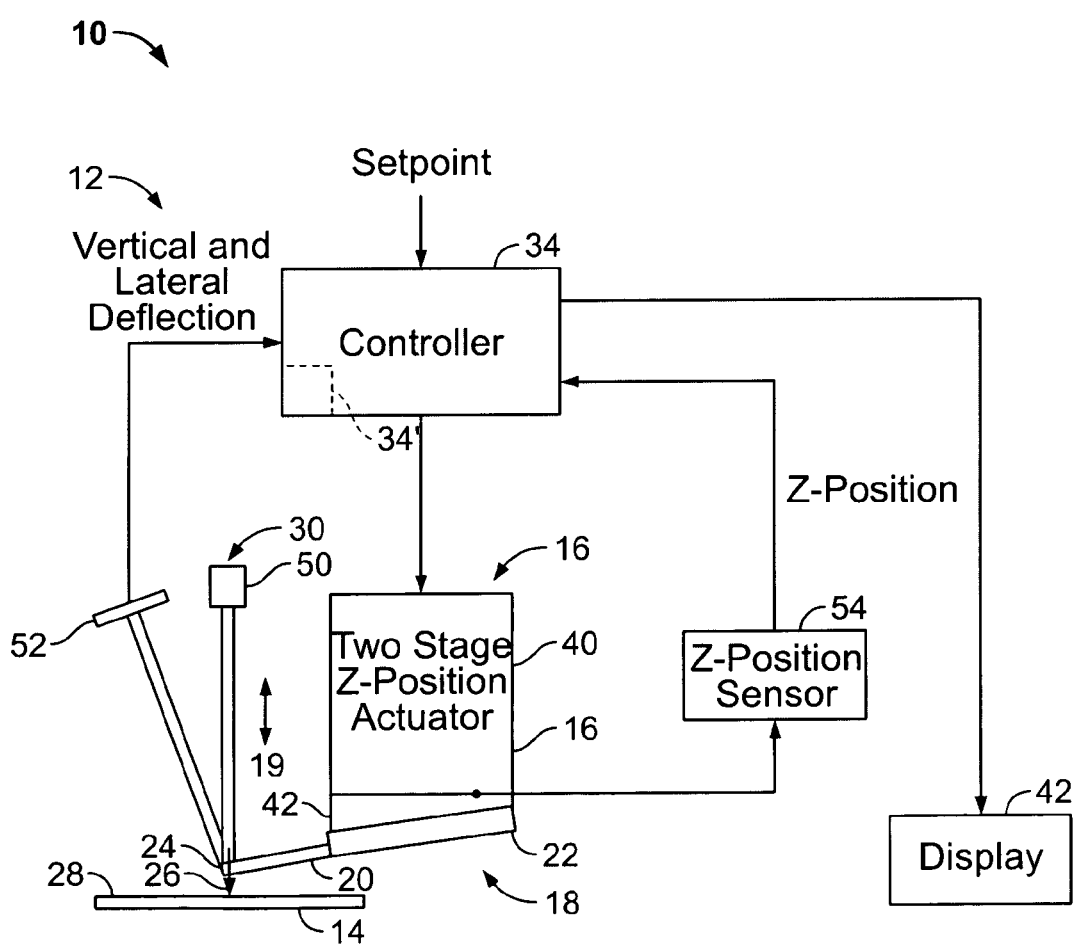
FIG. 3 is a schematic diagram of a probe based instrument with which a rapid approach control process performed in accordance with the invention may be implemented.

Referring to FIG. 3, a typical AFM 10 has a probe assembly 18 including a probe 19 configured to interact with a sample 14. Probe 19 includes a cantilever 20 having a tip 26 that interacts with sample 14. Probe assembly 18 includes a fixed end or base 22 preferably mounted to an AFM probe holder (not shown), while a free, distal end 24 of cantilever 20 supports tip 26. AFM 10 also includes a feedback loop 12 to control an AFM Z position actuator 16 or simply "Z actuator".

In operation, the interaction between tip 26 and sample surface 28 causes the deflection of cantilever 20. To measure this deflection, AFM 10 includes a deflection detector 30 that may preferably be an optical detection system for measuring the cantilever deflection by any suitable method. As is typical, the optical-based deflection detector 30 includes a laser 50 and a photodetector 52 that interact according to one of the previously described techniques. Of course, as mentioned previously, there are other cantilever motion measurement techniques, including interferometer, strain-gauge, piezo-resistive film applied to cantilever, etc., each of which could be used in the preferred embodiments. The resultant data are representative of information reflecting vertical and/or lateral deflection of cantilever 20. That information can then be extracted, either in analogue or digital circuitry located external to a controller 34 (detailed below), or circuitry within the controller, to obtain information regarding the lateral and vertical amplitude of the probe, as well as phase information, if the probe is operating in an oscillating mode such as TappingMode™.

With further reference to FIG. 3, controller 34 includes appropriate circuitry to compare the setpoint to a conditioned cantilever deflection signal, thereby generating an error signal that is at least indirectly indicative of a change in cantilever operation. Controller 34 is preferably a PID (proportional-integral-derivative) controller, and can be implemented in either analog or digital, and may apply either a linear gain or a gain characterized by a more complex computation. In particular, controller 34 can apply a gain to the error signal that is defined by one or more of a proportional, an integral or a differential gain.

Figure 1:
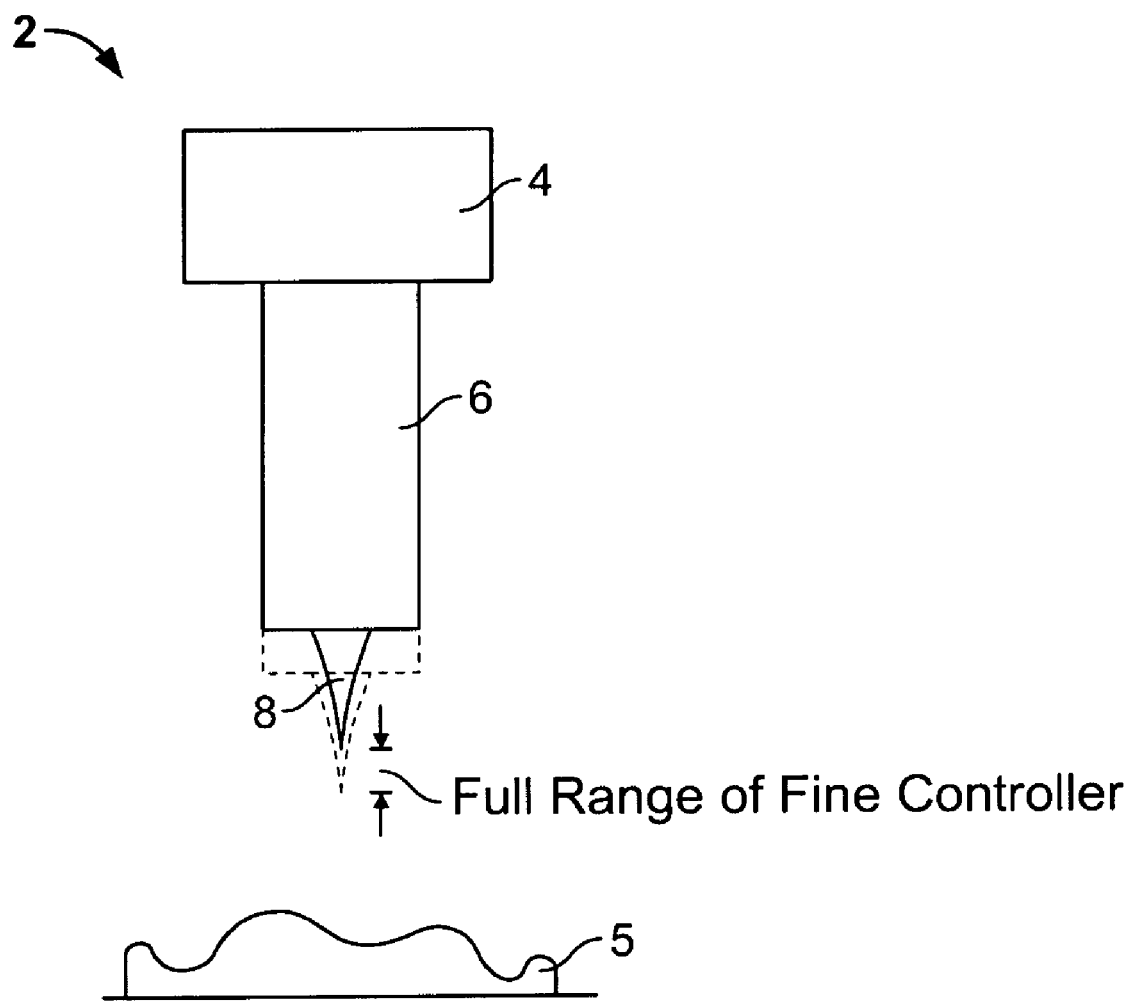
FIG. 1 is a schematic diagram of a prior art two-stage actuator used to cause a probe to automatically engage a sample surface, appropriately labeled "PRIOR ART"
Figure 2:
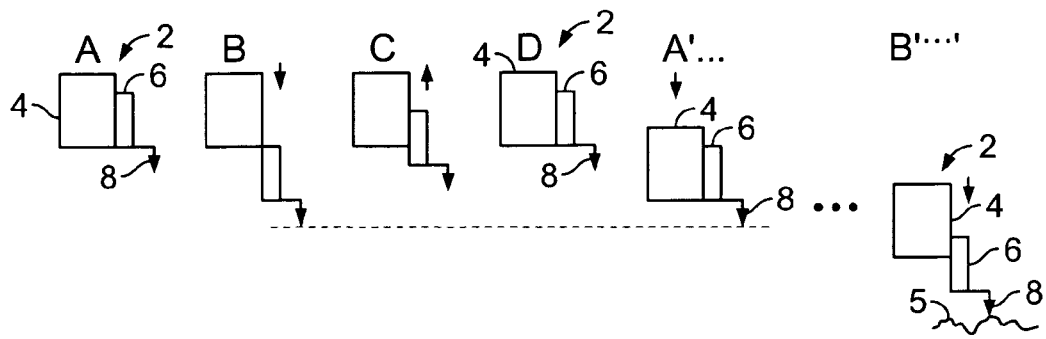
FIG. 2 is a schematic diagram of an engage process performed using the actuator of FIG. 1, appropriately labeled "PRIOR ART"

Note that to follow the evolution of the present invention, a first embodiment will be described (FIGS. 4-8) prior to your discussion of the more preferred embodiment illustrated in FIGS. 9-13B. In that regard, turning initially to FIG. 4, the Z actuator 16 is a two stage actuator including both a coarse positioning actuator 40 and a fine positioning actuator 42. The coarse positioning actuator 40 has a long range and can move rapidly, but has a relatively slow response. Note that although it is shown as driving the probe in FIG. 1, it could alternatively be operable to drive the sample while the probe remains stationary. The fine positioning actuator 42 has a relatively short range and cannot move as rapidly as the coarse actuator, but has a relatively fast response. The coarse positioning actuator 40 may, for example, be a stepper motor. The fine positioning actuator 42, may, for example, comprise a piezoelectric actuator and may be part of a self-actuated probe and control system such as that shown and described in U.S. Pat. Nos. 6,530,266 & 6,189,374, owned by the present assignee. Such actuators typically have an operating range of 8-15 microns. Preferably, the fine positioning actuator 42 is mounted on the coarse positioning actuator 40, and the probe assembly 18 is mounted in a probe holder (not shown) coupled to fine positioning actuator 40.

Figure 4:
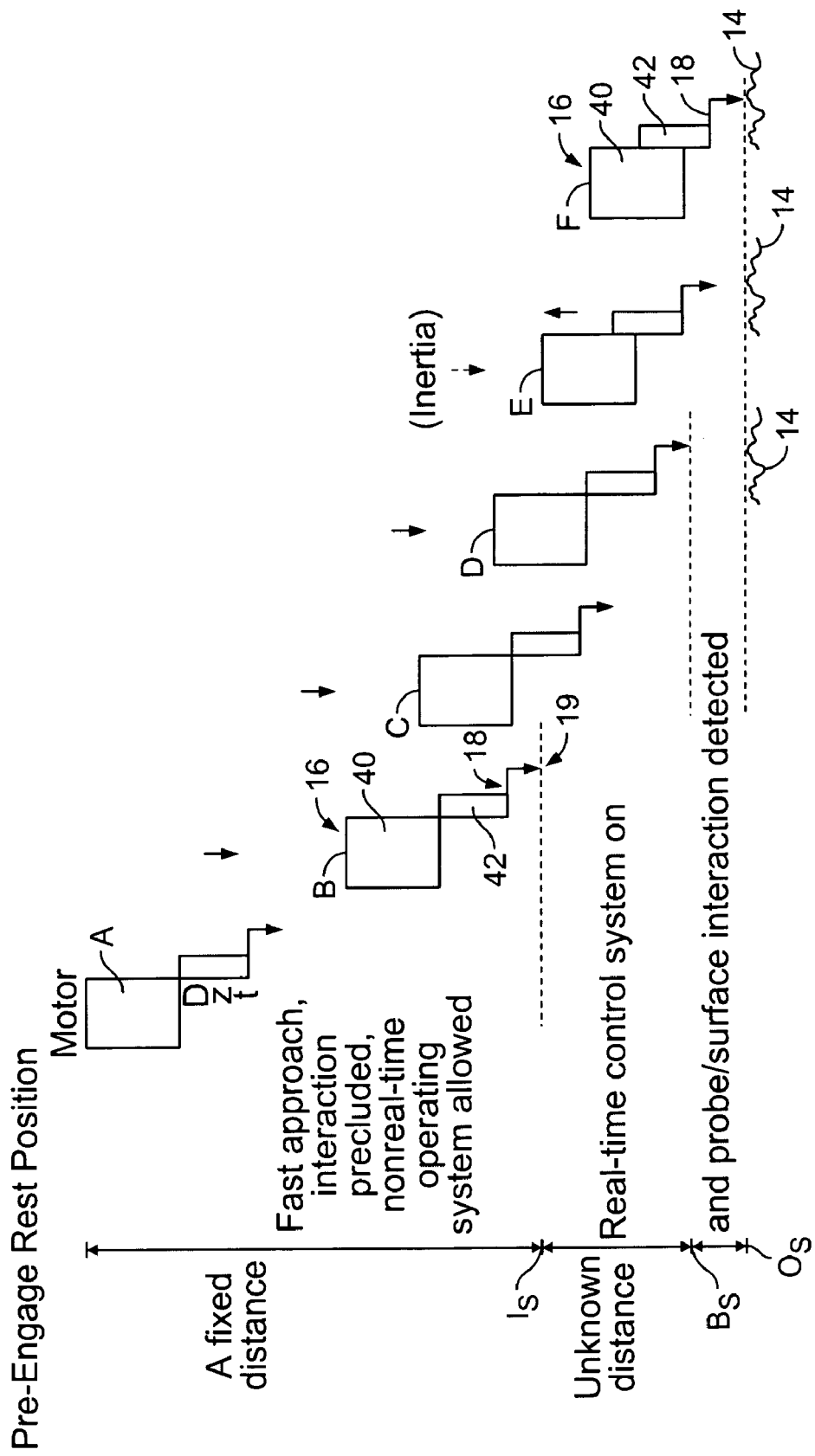
FIG. 4 is a schematic diagram of a rapid, automatic sample engagement process performed in accordance with a preferred embodiment of the invention.

Still referring to FIG. 4, the engagement process consists of a "fast approach phase" followed by a "close approach phase." Probe/sample interaction is precluded during the fast approach phase. The close approach phase occurs before the possibility of damaging probe/sample surface interaction and ends with engagement. For reasons explained hereafter, the fast approach phase can be controlled using a non real-time operating system.

During the fast approach phase, the fine positioning actuator 42 is fully extended, and the coarse positioning actuator 40 is driven at full speed (typically about 275 microns/second) through a fixed, safe distance to a position $I_S$ above the sample to which the actuator can travel without any danger of damaging probe/sample interaction. The actuator 16 is as shown at position $I_S$ in position "B" in FIG. 4.

It should be noted at this time that $I_S$ is a function of the operational mode of a given instrument and the medium in which the instrument is operating. It is also consistent over a wide range of individual samples and is well above the sample surface given that probe/sample interaction occurs above the sample surface, not just at the sample surface. For example, the respective range of Van Der Waal's forces in air or liquid approximates $I_S$ for contact mode SPM operation. For STM operation, the exponential growth of the current with proximity defines the minimum separation, which is based on the highest sustained current particular electronics will support in air before damage occurs. A corresponding $I_S$, typically to within about 20 microns of the sample surface, exists for TappingMode™ operation due to "squeeze film damping" or air damping of the cantilever and/or the probe tip penetration of the water meniscus present in many samples in air. This squeeze film damping typically results in 5 to 20 percent reduction in cantilever oscillation magnitude, and therefore is readily detectable by, for example, the optical beam bounce deflection detection scheme. Nevertheless, it is important to note that $I_S$ is a set distance based on an estimate of a "safe"

probe-sample separation, i.e., prior to or about where the squeeze film damping effect is predicted to occur, as noted above.

At the end of the fast approach phase (position B in FIG. 4), control is switched to a dedicated real-time controller and the coarse positioning actuator 40 is slowed to an approach speed of, e.g., 50 microns per second. At the same time, feedback is initiated in order to "search" for any probe/sample interaction. In TappingMode™ operation, the cantilever is excited to resonate at or near its resonant frequency. Typically, tip-sample separation is monitored under feedback using cantilever oscillation phase and/or amplitude. Actuation proceeds in this fashion until tip/sample surface interaction is detected, as represented by actuator positions "C" and "D" in FIG. 4. The approach speed during this period is still about double the approach speed available using techniques such as that described in the Ray patent. Then, when the probe 19 is in the vicinity of the sample surface or at a distance $B_S$ corresponding to a "braking setpoint" $A_B$ (FIG. 5, discussed below) the fine positioning actuator 42 is retracted. Preferably, the Z piezo is retracted from fully extended to fully retracted (8 um is the specific case) as fast as possible. The max retraction speed is limited by Z piezo scanner dynamics, and in one preferred case, is programmed to be about 20 ms. Thereafter, coarse positioning actuator 40 is eventually shut down (See position "E"). Preferably, the SPM Stage is decelerated as fast as possible. Notably, due to inertial and dynamic forces, actuator 16 continues to move probe 19 towards sample 14, which is accounted for when setting $B_S$. After the coarse positioning actuator 40 comes to rest, the fine positioning actuator 42 is controlled under feedback to perform the engagement function by placing the probe near sample 14 according to an operating setpoint $A_O$ corresponding to position $O_S$. (See position "F").

Optionally, a Z-position sensor 54 (FIG. 3) may be included to monitor the amount of Z translation provided by actuator 16, and thus provide an integrity check. Z-position sensor 54 can also be used in the control loop to determine when to brake or when to switch to the fast approach phase of the engage process, described below. For instance, a sufficiently precise sensor 54 can be used to measure a certain reduction in tip-sample spacing, rather than detecting squeeze film damping.

In an AFM operating in TappingMode™, the setting of $I_S$ and feedback control can rely on the knowledge that tip oscillation amplitude gets smaller as the tip approaches the sample surface due to tip/surface interaction effects described earlier, such as squeeze film damping. To illustrate this further, the phases of the surface engagement process in TappingMode™ operation are identified on the curve 60 in FIG. 5. The tip oscillation amplitude ranges from 100% of its free air amplitude $A_{FA}$ when the tip is unaffected by the sample to 0% when the tip is pressed firmly against the sample. At some point in between, tip oscillation amplitude will first decrease, again due to squeeze film damping and possibly other factors. However, the preferred technique changes from the fast approach phase of the engagement operation to the close approach phase empirically when probe 19 obtains its safe position $I_S$ above the sample surface 14. With additional reduction in probe/sample spacing, probe oscillation amplitude will decrease upon initial interaction with the sample surface at point 62, a position at about $B_S$. The preferred process retracts the fine positioning actuator 42 and prepares to shut down the coarse positioning actuator 40 at about this braking setpoint $A_B$, corresponding to a braking position $B_S$, occurring soon after initial reduction in probe oscillation amplitude. The braking setpoint $A_B$ preferably is about 80% to 95% of the free air oscillation amplitude $A_{FA}$. The two stages 40 and 42 of the Z-actuator 16 are thereafter controlled to result in stationary positioning of the coarse positioning actuator 40 and positioning of the fine positioning actuator 42 at its mid-range with the probe oscillating at about an operating setpoint $A_O$ corresponding to position $O_S$.

Figure 5:
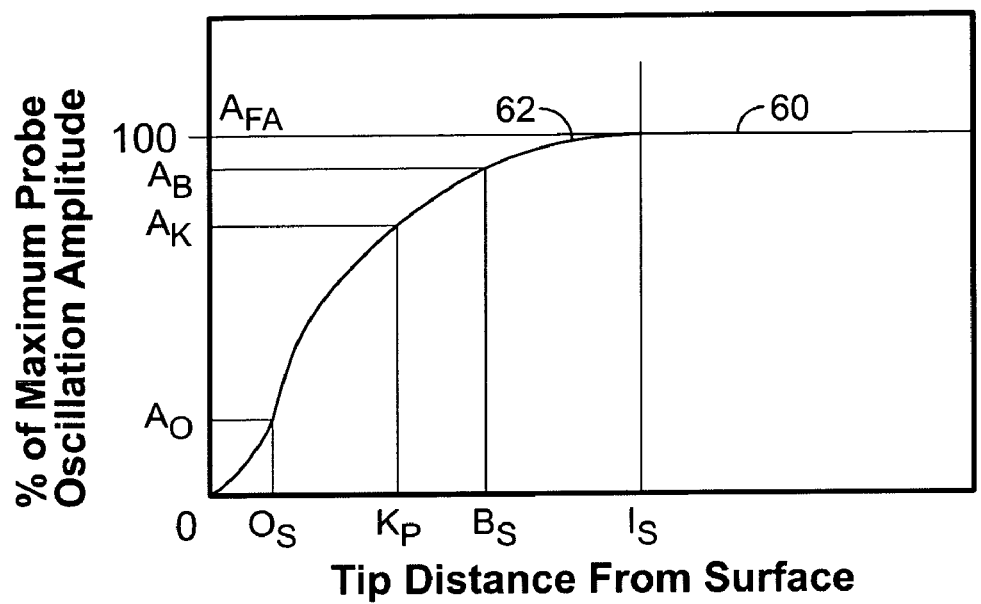
FIG. 5 is an amplitude versus distance curve showing the braking setpoint and imaging setpoint for a process in accordance with an embodiment of the invention.
Figure 6:
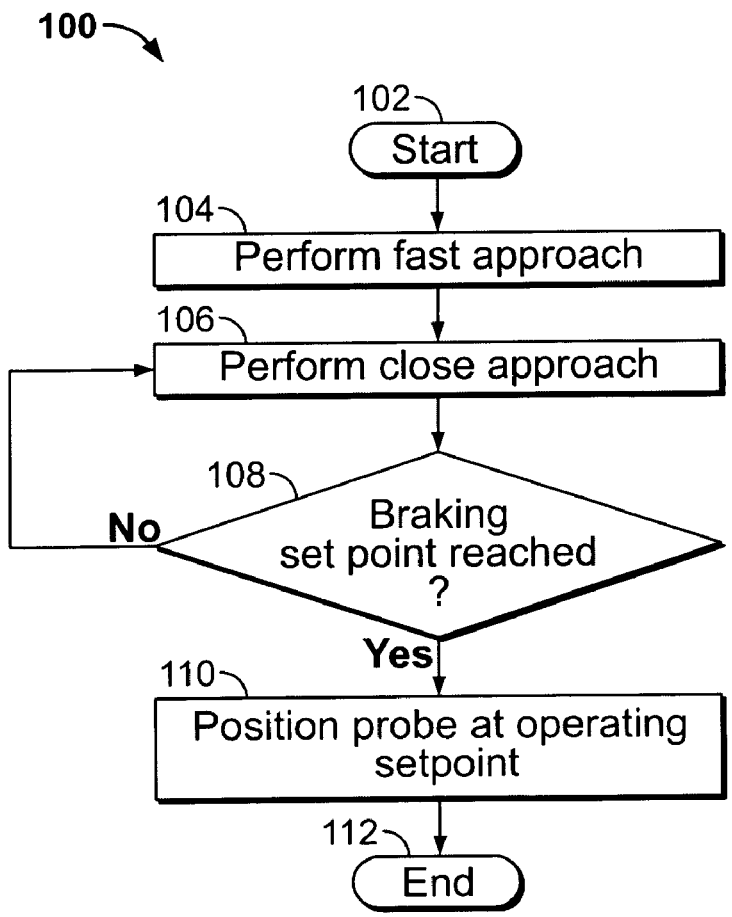
FIG. 6 is a simplified flowchart of a rapid approach process performed in accordance with an embodiment of the invention.

The base process illustrated and discussed conceptually above in connection with FIGS. 4 and 5 is presented conceptually in the flow chart of FIG. 6. At least a portion of that process will typically, but not necessarily, be performed by the controller 34. It is especially preferred to be controlled by a dedicated real time controller 34' (FIG. 3) that interrupts operation of a non real-time operating system, such as Microsoft Windows®, of the controller 34 upon initiation of the close approach phase. A suitable controller 34' (FIG. 3) is available from Galil Motion Control.

A dedicated, real-time controller 34' is preferred for the close approach phase because any interrupt of system control during the close approach phase would risk undesired probe/sample surface interaction and damage to the probe and/or sample.

The process 100 proceeds from a start-up and initialization step at Block 102 and proceeds to Block 104 to initiate the fast approach phase of the engage process to drive the actuator 40 through a fixed stroke terminating at predetermined safe position $I_S$. The controller 34 energizes the coarse positioning actuator 40 to drive the Z actuator through a fixed stroke to drive the probe to the position $I_S$. Notably, the fast approach phase does not require feedback. It can therefore be controlled using a high-speed control algorithm independent of feedback. Again, a high-speed control algorithm of this type can be implemented using a non real-time system, such as Microsoft Windows® within the main controller 34. As indicated above, this stroke will depend upon, e.g., the nature of the instrument, the measurement being taken, and the medium in which the instrument is operated. It typically would be on the order of 800 microns.

Next, in Block 106, the process 100 transitions control of the Z actuator 16 to the dedicated controller 34' which then reduces the speed of coarse positioning actuator movement to, e.g., 50% of its maximum speed. At the same time, it drives the previously extended fine positioning actuator 40 to retract in order to avoid premature engagement with the sample surface and to facilitate optimal fine positioning actuator positioning for surface characteristic measurements. Feedback monitoring of probe operation is also initiated at this time. In the present example of TappingMode™ operation, cantilever oscillation amplitude and/or phase typically will be measured. In the case of amplitude, the cantilever 20 will initially be oscillating at 100% of its free air oscillation amplitude, i.e., an oscillation amplitude completely unaffected by probe sample interaction.

The monitoring results in an inquiry in Block 108 regarding whether or not the probe has reached the braking setpoint $A_B$ at position $B_s$. That is, the controller 34' will determine whether the monitored parameter of probe operation has changed sufficiently to indicate initial probe sample interaction. In the case of TappingMode™ operation, the controller 34' will determine whether squeeze film damping or other influences resulting from probe proximity to the sample surface have reduced probe oscillation amplitude to $A_B$, which may be, e.g., 85-95% of the free air oscillation amplitude. If the inquiry to the answer of Block 108 is NO, indicating that the probe 19 is not yet sufficiently within the vicinity of the sample, the process 100 returns to Block 106 and continues to drive the coarse positioning actuator 40 toward the sample at the reduced speed.

If, on the other hand, the answer to the inquiry of Block 108 is YES, indicating that the probe 19 is in the vicinity of the sample surface, i.e., probe/sample interaction exists, the process 100 proceeds to Block 110, where the controller 34' positions the actuators 40 and 42 to place the probe in its engaged position for operation at setpoint $A_O$, corresponding to a probe-sample distance $O_S$. This process preferably comprises partially retracting the fine positioning actuator 42 while ultimately shutting off power to the coarse positioning actuator. A preferred technique of this process will be described in conjunction with FIG. 7 below. As a result, the probe 19 is positioned in its engaged position in which the two stages 40 and 42 of the Z actuator 16 are situated such that the probe 19 is positioned according to the operating setpoint $O_S$ with the fine positioning actuator 42 being located at approximately the mid range of its operational stroke, hence permitting a full range of motion of the fine positioning actuator about setpoint position $O_S$. The process then proceeds to END in Block 112.

Figure 7:
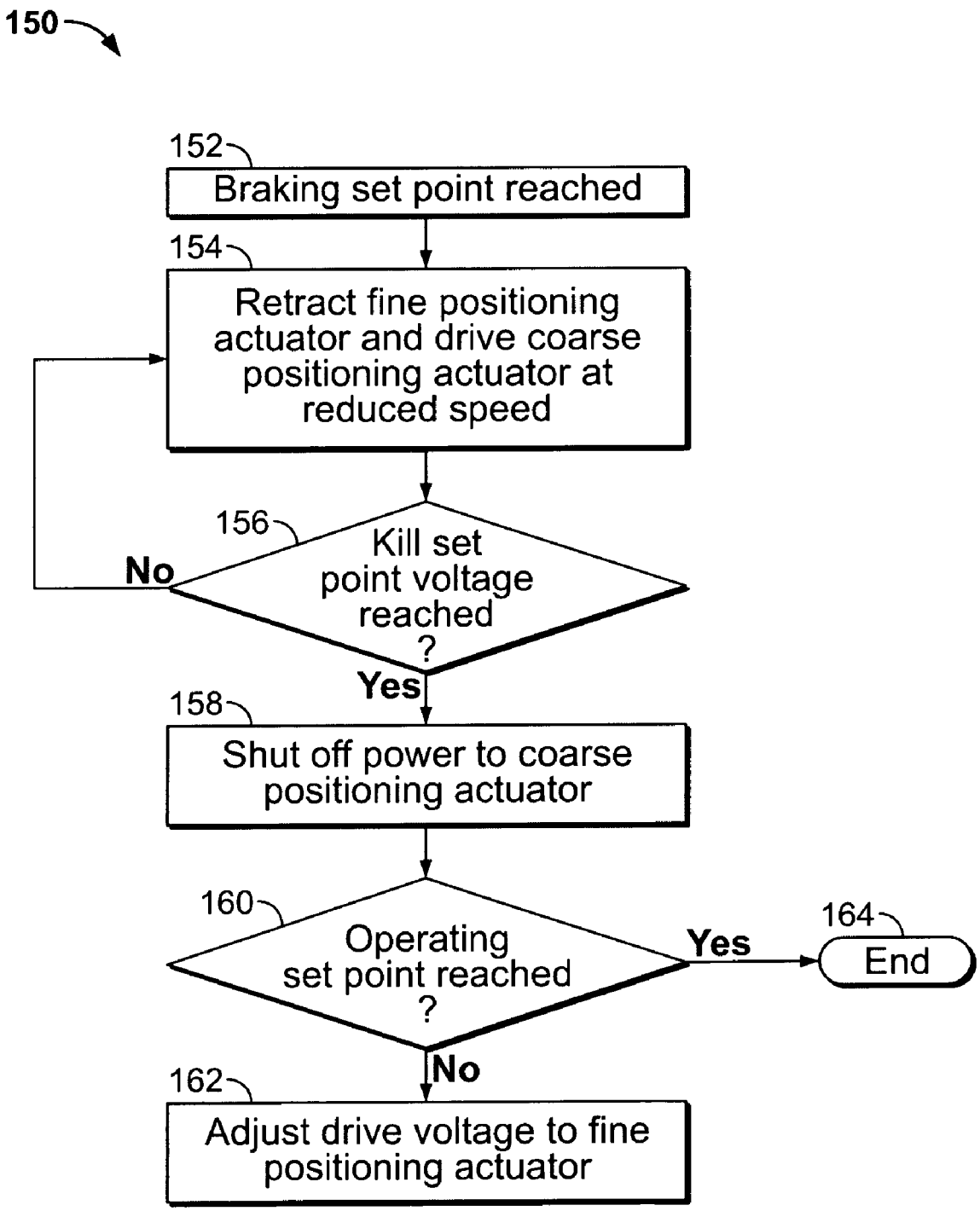
FIG. 7 is a flowchart for implementing a portion of the process depicted in FIG. 6 of a rapid approach process performed in accordance with an embodiment of the invention.
Figure 8A:
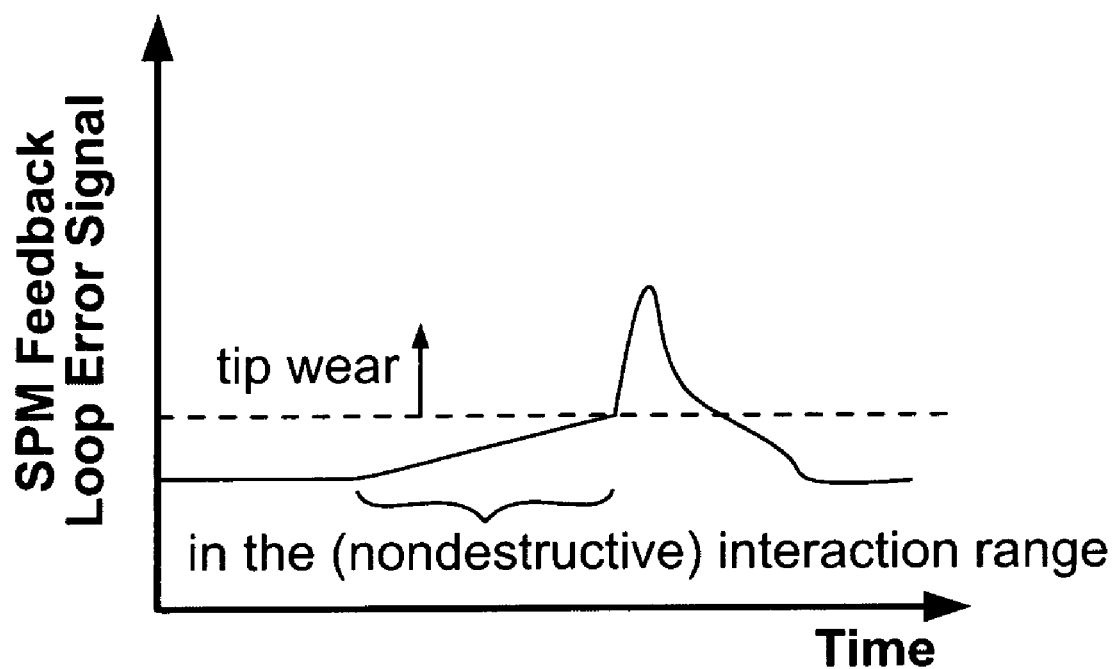
FIGS. 8A and 8B are graphical illustrations of tip wear observed using a prior art method (8A) and this embodiment (8B)
Figure 8B:
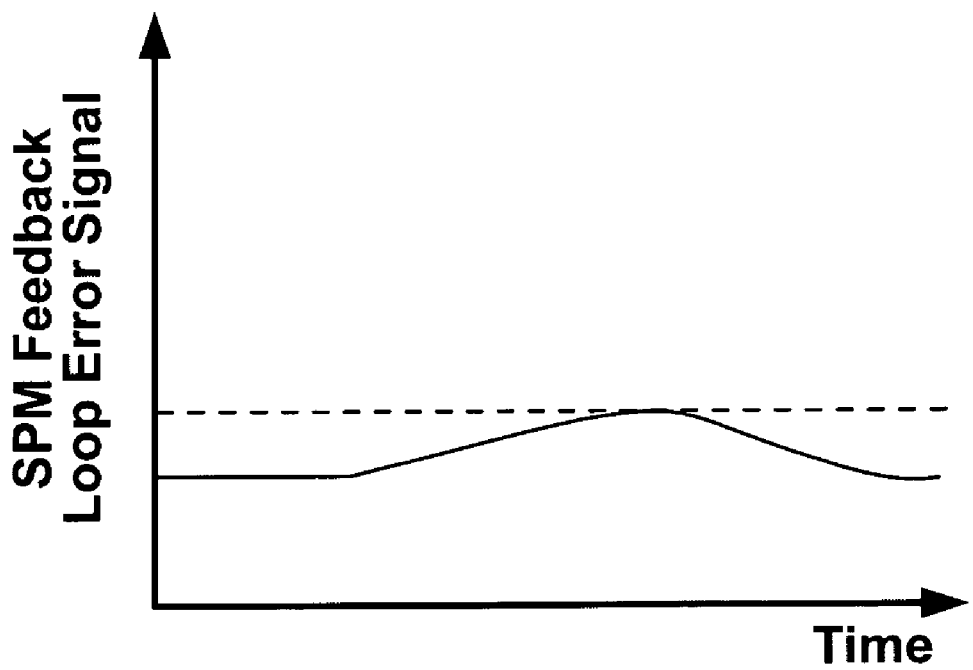

Referring to FIG. 7, after the close approach phase begins at distance $I_S$ (i.e., control is switched to the dedicated real-time controller, and the output of actuator 40 is slowed) the preferred process 150 for implementing a second part of the close approach phase of the engage process begins at Block 152 where probe oscillation at the braking setpoint $B_S$ is detected. The controller 34' then drives the fine positioning actuator 42 to retract in Block 154 as the coarse positioning actuator 40 continues to move downwardly. The drive voltage for the fine positioning actuator 42 increases as the fine positioning actuator 42 moves upwardly. In Block 156, the routine determines whether a "kill setpoint", $A_K$ at about tip-sample distance $K_P$ (see FIG. 5), of fine positioning actuator drive voltage has been reached. The kill setpoint $A_K$ is selected taking known inertial characteristics of the coarse positioning actuator 40 into account, to shut off drive voltage to the coarse actuator 40 at a time that will cause the actuator 40 to drift to a stop generally in a position in which the 1) the probe 19 is located at a position $O_S$ corresponding to its operating setpoint $A_O$ and 2) the fine positioning actuator is positioned at least approximately midway along its stroke.

If the answer to the inquiry of Block 156 is NO, the process returns to Block 154 and the controller 34' continues to drive the coarse positioning actuator 40 downwardly. If the answer to the inquiry of Block 156 is YES, the process 150 proceeds to Block 158 whereupon the controller 34' shuts off the power to the coarse positioning actuator 40 and allows the coarse positioning actuator 40 to drift to a stop. The process 150 then proceeds to Block 160 to determine whether the probe oscillation amplitude is at an operating setpoint $A_O$ indicative of probe positioning at tip-sample separation $O_S$. If not, the routine 150 proceeds to Block 162 and increases or decreases the fine positioning actuator voltage as required to move the probe 19 towards the operating setpoint position $O_S$. When the probe oscillates at the operating setpoint $A_O$ with the coarse positioning actuator 40 at rest, the process then proceeds to END in Block 164. At this point, the engage process is complete, and the desired measurements can be taken in traditional fashion.

The inventors have proven experimentally that automatic nondestructive probe engagement as described above can be consistently performed in less than 10 seconds from initiation when the probe is fully retracted, i.e., when the coarse positioning actuator is fully retracted. This fully retracted tip-sample separation can be a maximum separation where no tip-sample interaction, or related interaction, exists. Such separation can be, for example, 100 microns, or even a few millimeters, and the improved engage speeds will still be realized. This represents a marked improvement in engage speeds over earlier techniques and greatly increases the attractiveness of probe based instruments to manufacturing and other applications in which a high number of measurements must be taken as quickly as possible. Moreover, the occurrence of broken or otherwise damaged tips is also reduced. An illustration of tip wear observed using a conventional technique (FIG. 8A) and what could be achieved with the preferred embodiments, especially with the one described immediately hereafter, (FIG. 8B) is presented to highlight the benefits of the preferred embodiments with respect to probe life and integrity. This is especially advantageous when using costly probes, such as the self-actuated probes having integrated actuators referenced in the assignee's patents cited earlier.

Figure 9:
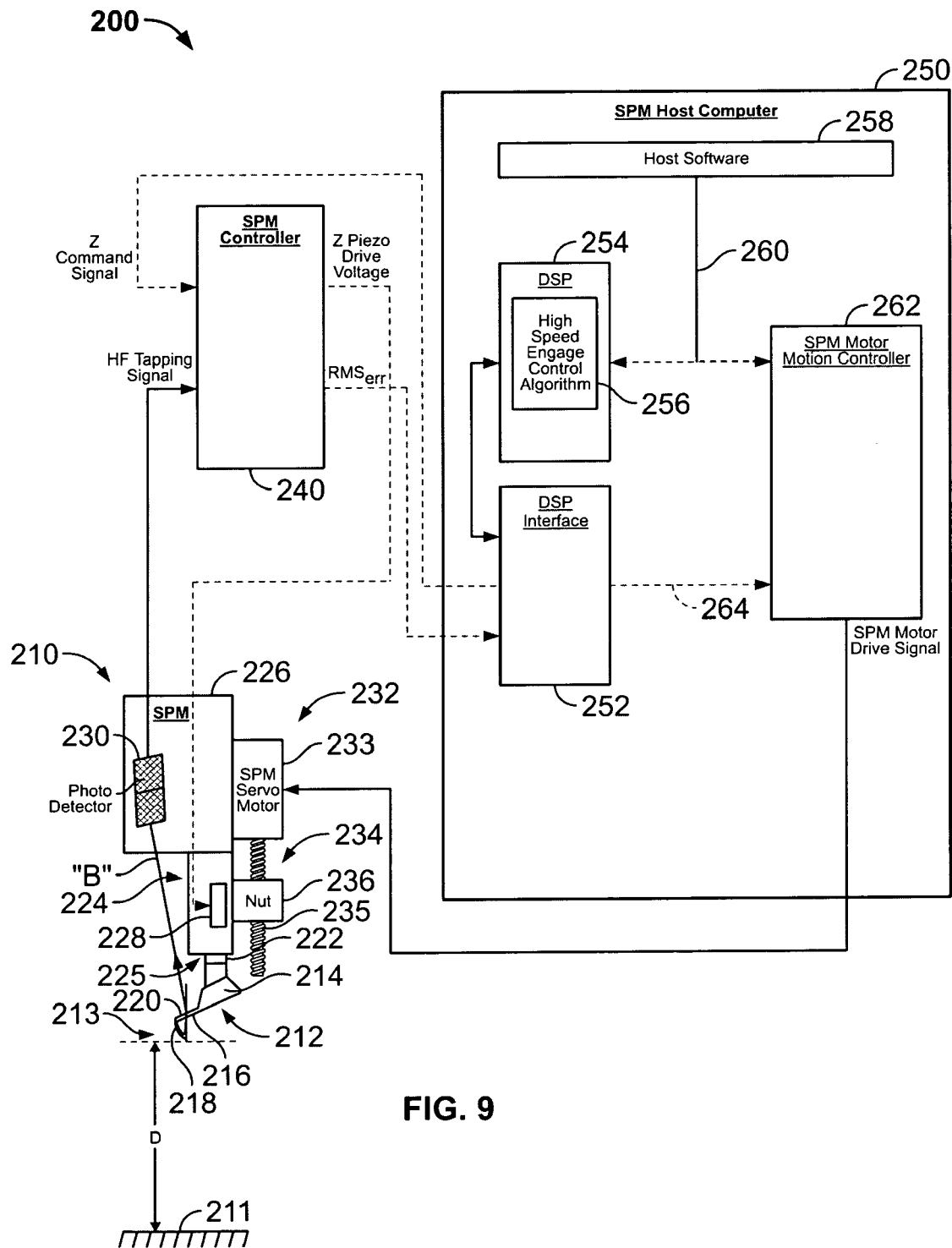
FIG. 9 is a schematic diagram of an SPM including an SPM head coupled to a control apparatus to implement a rapid engage algorithm according to a more preferred embodiment.

In an alternative, and more preferred, design and corresponding algorithm for rapidly engaging the probe and sample, reference is made to FIGS. 9-13B. Turning initially to FIG. 9, an SPM 200 for rapidly engaging a probe and a sample is illustrated. SPM 200 includes an SPM head 210 that retains a probe assembly 212 for imaging a sample surface 211. Probe assembly 212 includes a probe 213 extending from a base 214. Probe 213 includes a cantilever 216 having a fixed end extending from base 214 and a tip 218 extending generally downwardly toward sample surface 211 from a generally free end of cantilever 216. Probe assembly 212 is mounted in a probe holder that itself typically supports an oscillator 222 for oscillating probe 213 according to the mode of SPM operation, for example, TappingMode™ (TappingMode™ is a trademark of Veeco Instruments Inc. of Santa Barbara, Calif.). Probe assembly 212 is further supported by a scanner 224 such as an SPM axis stage (i.e., an X-Y-Z piezoelectric scanner) that provides movement of the probe 213 in three orthogonal directions relative to sample surface 211. The X-Y-Z scanner 224 is supported by a chassis 226 of head 210 and includes a distal freely-moving end 225 to which probe assembly 212 is coupled in this embodiment. In that regard, although probe assembly 212 is coupled to scanner 224 in the preferred embodiment, and more particularly a Z-piezo 228 of scanner 224, those skilled in the art will appreciate that it is the relative spacing between probe 213 and sample surface 211 that is key to SPM operation such that X-Y-Z scanner 224, or some portion thereof, could be coupled to sample surface 211. The range on the Z-piezo 228 is preferably about 8 microns, but a 15 um head or larger head could be used, though beyond 50 microns the dynamic response of the actuator 228 could become too slow. Notably, for reasons that will become apparent, the X-Y-Z actuator 224 is periodically referred to herein as the "second" actuator.

Chassis 226 also supports the remaining components of the SPM head 212 including a detector 230 such as a quadrant photo-detector that receives reflected light "B" from a backside 220 of probe 216. More particularly, light beam "B" is generated by a laser (not shown) mounted in SPM head 210 and directed toward backside 220 of probe 216. As tip 218 interacts with sample 211, the reflected beam translates across photodetector 230. SPM head 210 includes a number of other components (optics for viewing the probe/sample, etc.) but those are not the focus of the preferred embodiment and thus further discussion in that regard is not provided.

Finally, a linear or coarse actuator 232, preferably including an SPM servo motor 233 that drives a screw and nut arrangement 234, is provided and used as a first actuator in the present engagement processes to bring probe 213 into engagement with sample surface 211. More particularly, servo motor 233 is coupled to chassis 226 of head 210 and drives a screw 235, while a nut 236 engaged with screw 235 is coupled to scanner 224 to move the scanner in response to actuation of motor 233. As further detailed below, actuator 232 operates to quickly and safely bring probe 213 into close range of sample surface 211 in a Continuous Mode of the rapid engage algorithm of the preferred embodiment, typically less than about 100 microns, from an initial probe/sample separation of at least 500 microns, and more typically 1 mm. In an alternative, it is possible to modify a few control parameters to start the engage process form a lower initial height. In this "short withdraw" option, the probe is withdrawn only about 100 um between sites. This typically requires a very flat sample, such as a silicon wafer. In addition, actuator 232 is used to step probe assembly 212 toward the sample surface 211 in a Step Mode of the rapid engage algorithm. Notably, of course, actuator 232 could be a stepper motor driving a screw, a large range piezo driven stage, or any long range actuator capable of bringing the SPM into close proximity of the sample.

For the purposes of this application, initial separation refers to the vertical distance between the tip and sample surface when the tip is first brought over a region of interest. Initial separation does not refer to the tip-sample distance after a user has done a manual adjustment to bring the probe close to the sample. This separation can be more than 20 microns and typically is at least 100 microns, and more typically, 1 or several mm. In any event, the initial separation is not one in which the probe-sample separation is manually brought to a relatively close, yet safe, distance, such as less than 20 or even 10 microns by laborious and time-consuming manual techniques (e.g., using optical viewing).

Microscope 200 next includes an SPM controller 240 that receives high frequency (HF) oscillation signals, for instance, from photodetector 230 based on translation of the reflected light beam "B" thereon as the tip interacts with the sample surface 211. Controller 240 generates a corresponding error signal based on a parameter of the oscillation signal (e.g., amplitude, phase, etc.) which is indicative of probe-sample interaction. More particularly, the high frequency signal is input to controller 240 which, for example, includes an RMS-to-DC converter or a lock-in amplifier that generates, for example, an RMS amplitude signal (the preferred oscillation parameter to monitor). Thereafter, the RMS amplitude signal is compared to a setpoint (again, as an example, amplitude) that corresponds to the desired tip-sample spacing for imaging probe-sample interaction. In response, controller 240 first generates an analog error signal.

Then, prior to being output by controller 240, the analog error signal is converted to a digital signal and output as the $RMS_{err}$ signal. The $RMS_{err}$ signal is transmitted to an SPM host computer 250 where it is processed according to the desired SPM operation (engage, mode of sample imaging, etc.). In general, SPM host computer 250 uses efficient system architecture to execute the rapid engage control algorithm of this preferred embodiment to facilitate high-throughput SPM applications.

More particularly, to engage probe 213 and sample 211, the $RMS_{err}$ signal is transmitted to an interface 252 of a digital signal processor (DSP) 254 of host computer 250. DSP 254 includes a high speed engage control algorithm 256 that operates to bring probe 213 into engagement with sample surface 211 as quickly as possible with little chance of damage to either probe 213 or sample surface 211. Notably, it does so by using feedback based on the $RMS_{err}$ signals, i.e., actual tip-sample interaction, through most of the engage process. Similar to some prior methods, a two part engage is performed including a fast, continuous move portion of the algorithm (Continuous Mode), and a "sewing" portion (Step Mode).

Importantly, as described in further detail below, the system architecture is able to communicate the engage control signals in generally real-time with tip-sample interaction to more efficiently, and thus more rapidly, complete the engage operation.

Before turning to further details of the system's architecture it is important to reiterate that in conventional systems the DSP is utilized to control a motion controller that communicates with, for example, a sample stage to reduce probe-sample spacing but does so always via regulation by the software of the host computer (e.g., the operating system). Such an arrangement is shown in FIG. 9 for illustrative purposes, where DSP 254 can communicate with SPM motor motion controller 262 via a PCI communication bus 260 through a host computer motherboard. A key disadvantage of implementing probe-sample engage control algorithms with such architecture is that both the PCI bus and the operating system of the host (traditionally, the source of commands to the motion controller) can be highly non-deterministic, and thus there are inherent latencies in communicating control signals to the motion controller 262, whereby commands typically are executed serially. Clearly, this drawback can significantly limit the speed with which the probe and sample can be engaged. As a result, previous engage routines which use similar architecture have proven unacceptable for the high throughput applications contemplated by this preferred embodiment. In the end, though it is possible to have the DSP communicate to the motion controller via the PCI bus, it is not preferred.

The preferred embodiment illustrated in FIGS. 9-13B obviates this problem, again, by (1) feeding back on tip-sample interaction throughout the engage process, including the continuous move portion, and (2) coupling DSP interface 252 to SPM motor motion controller 262 via a direct communication link 264, such as a parallel digital communication (COM) cable, or a high speed serial COM connection with some readily made additions and modifications. As will be detailed below, this direct link between the DSP and the SPM motion controller allows the SPM motion controller 262 to generate SPM motor drive signals that are based on the detected oscillation of the probe, without intermediate processing by the host computer 250.

With respect to the first part of the solution noted immediately above, what in the past had been a "blind" move via instructions from the motion controller 262 to servo motor 232 to reduce probe sample separation a pre-determined distance, motion controller 262 in the present case controls servo motor 232 with knowledge of the interaction between the probe 213 and the sample 211. By using feedback control based on probe-sample interaction, the fast, continuous move portion of the algorithm is able to "see" the sample surface by continuously detecting changes in the oscillation of the probe. As a result, the Continuous Mode operates to reduce the separation from an initial distance "D" shown in FIG. 9 to a safe probe sample separation, periodically referred to as the step mode separation, quickly and safely.

Notably, the majority of information processing and decision making in the preferred embodiment is done by the DSP. For instance, the DSP receives information about AFM cantilever motion from the microscope controller and also sends Z piezo stage commands to the microscope controller. The DSP sends motion commands (either high speed 'jog' command, where the stage moves at constant, high speed, or 'step' command with each incremental step ranging from 4 um down to less than 1 um) to the, for instance, Galil motion controller, which is tasked with controlling the motion of the SPM axis stage. The DSP also receives a small amount of information back from the Galil, mainly status information.

Figure 10:
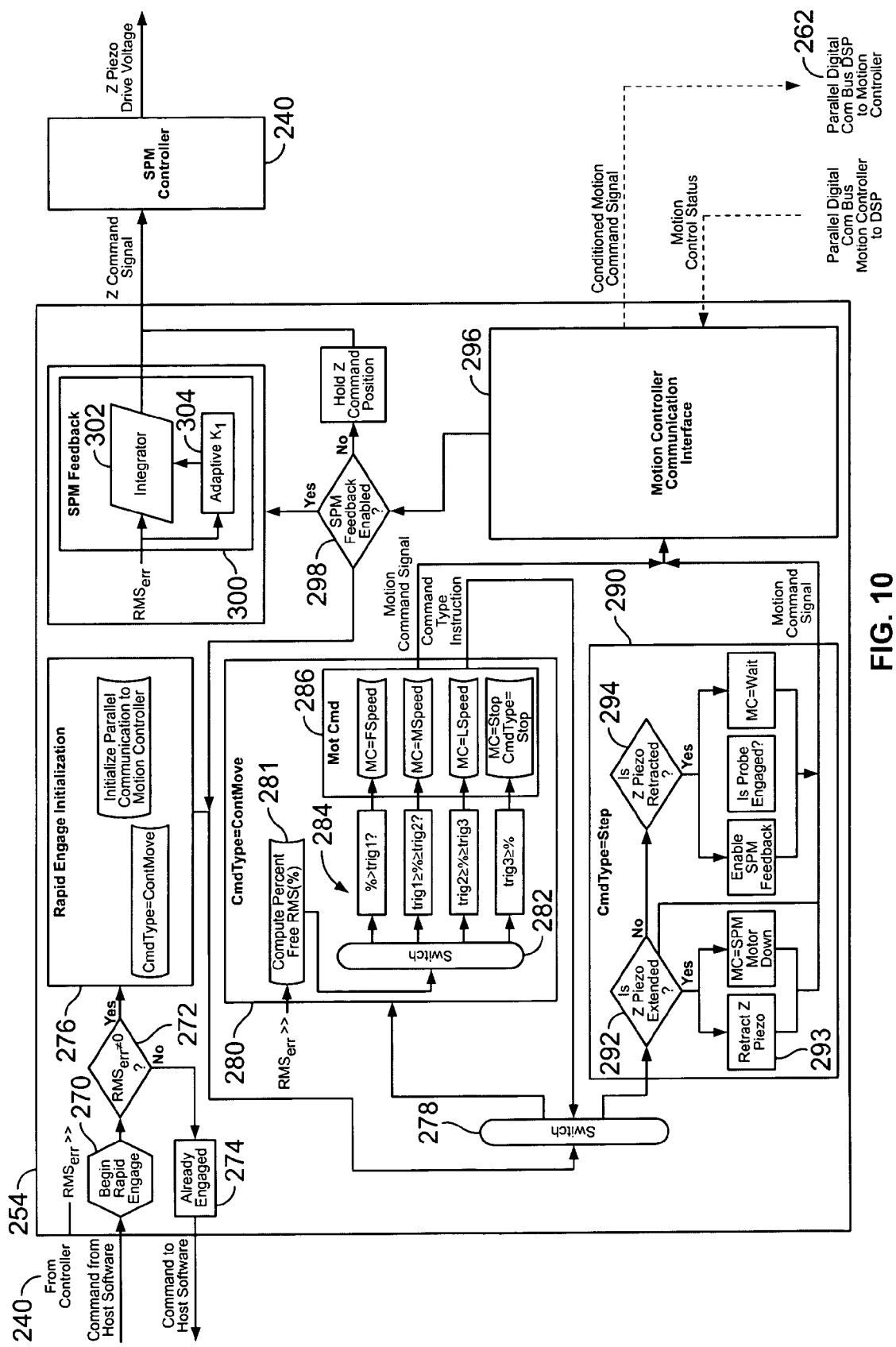
FIG. 10 is a more detailed schematic view of the DSP of the SPM host computer shown in FIG. 9.
Figure 11:
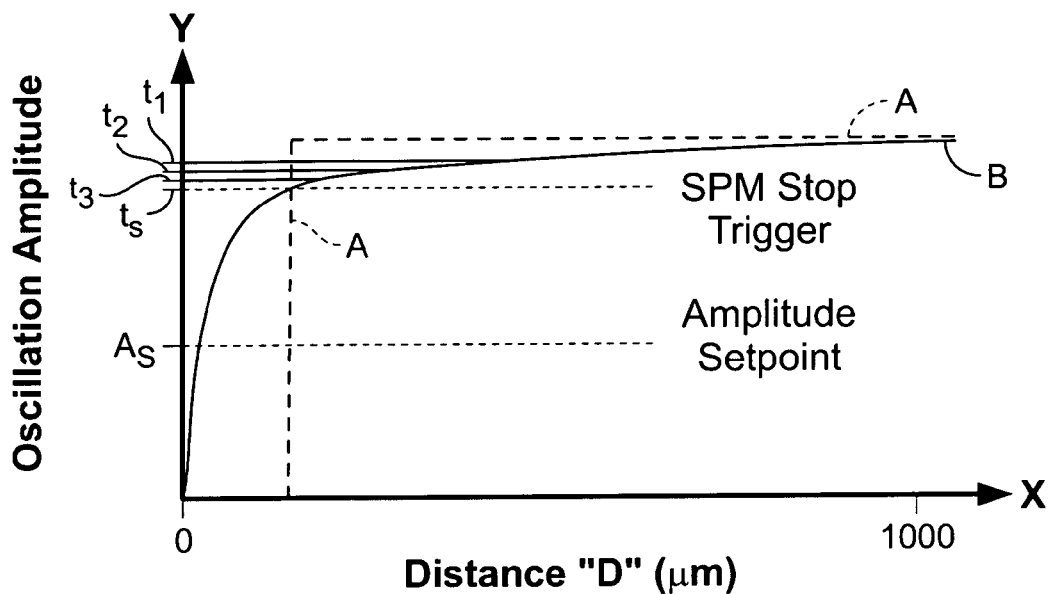
FIG. 11 is a graph illustrating the amplitude response of an oscillating SPM probe brought into contact with a sample surface using the rapid engage control architecture shown in FIGS. 9 and 10.

Turning to FIGS. 10 and 11, the functions of the controlling DSP 254 are described and illustrated in further detail. In FIG. 10, DSP 254 has a first input that receives an instruction ("Command from Host Software") to begin the engage process, communicating that instruction to a "Begin Rapid Engage" module 270. Next, DSP 254 includes a first decision module 272 that begins the rapid engage algorithm. In decision module 272, the algorithm determines whether the $RMS_{err}$ (received at a second input of the DSP) is not equal to zero. If "no" such that the $RMS_{err}$ is equal to zero, the algorithm knows that the probe and sample are already engaged (module 274), and no further engage instructions are necessary. In that case, a command is sent to the host software that ultimately lets the user know that the probe is engaged with the sample. If however, the $RMS_{err}$ signal is not equal to zero, the rapid engage routine is initialized at module 276. At this point, parallel communication to the motion controller is initiated and a routine control signal "CmdType" is set to a Continuous Move (i.e., begin Continuous Mode). Again, the rapid engage algorithm preferably includes two modes, a first mode in which the probe-sample separation is reduced rapidly to a safe distance (Continuous Mode), and then a second mode in which the probe-sample separation is stepped toward probe-sample engagement (Step Mode). At this point of the engage routine, the Continuous Move instruction is sent to a "CmdType" switch 278 that directs control to a Continuous Move module 280 used to implement the algorithm.

With the $RMS_{err}$ as an input, the Continuous Move module 280 operates to determine whether threshold triggers have been met by the $RMS_{err}$ signal, and if so, instructs the motion controller to correspondingly control linear actuator 232 (FIG. 9). In particular, the Continuous Move module 280 computes what percentage of a corresponding parameter (e.g., amplitude) of the free air RMS oscillation of the probe the measured probe oscillation achieves based on the $RMS_{err}$ signal. Again, the free oscillation of the probe is the oscillation of the probe when driven by a selected drive signal. The RMS amplitude of free oscillation (for example, 1 volt peak-to-peak) is compared with the measured probe oscillation as represented by the $RMS_{err}$ signal in the "Compute Percent Free RMS" module 281. Once the percentage (%) is determined, a corresponding "percent" signal is transmitted to a switch 282 that controls the output of a Motion Command module 286. This is accomplished by comparing the computed percentage (%) to one or more trigger thresholds 284.

Once motion command module 286 determines whether a trigger threshold has been met, it transmits the appropriate Motion Command Signal to a motion controller communication module 296. Module 296 conditions the motion command signal to convert it for communication to motion controller 262 (FIG. 9), preferably in parallel 8-bit format. Notably, this "Conditioned Motion Command" signal is also communicated to an SPM Feedback Enabled module 298 to switch feedback appropriately depending upon the conditioned motion command signal. In the Continuous Mode, for example, feedback is always enabled, thus fully extending the Z-piezoelectric actuator 225, described further below. Communication module 296 of DSP 254 also monitors the status of motion controller 262 by generally continuously receiving a Motion Control Status signal from controller 262, thus tracking whether the instructed motion is complete.

In this case, four trigger thresholds 284 are shown. As an example, if the percentage (%) is large enough, i.e., percent (%) greater than "trig1," then that provides an indication that there is little to no probe-sample interaction, and thus the motion command signal output by module 286 can be the fast speed motion command (MC) signal, "Fspeed." "Fspeed" refers to "fast speed" and the corresponding signal operates to ultimately move the second actuator 232, and thus probe 213 in this case, to reduce "D" at its top speed. This is ideal because, with no tip-sample interaction (because the detected RMS amplitude is the same, or nearly the same, as the free air oscillation amplitude), the risk of damaging either the probe or the sample is low.

For example, if the RMS oscillating amplitude of a free oscillating probe is one volt peak-to-peak, the first trigger "trig1" may be set at 0.96 which, as those skilled in the particular application would know, might indicate interaction of the probe tip within the squeeze film damping layer of the sample surface. Once met, thus indicating that the computed percent (%) is greater than a second trigger "trig2" but less than "trig1," then a motion command corresponding to a medium speed (MSpeed) is transmitted as the motion command signal, thus decelerating motor 232. Subsequent triggers could be set at something like 94% and then 92%, until ultimately the measured RMS amplitude (i.e., $RMS_{err}$) is at a percentage that signifies that the algorithm should switch from the Continuous Mode to the Step Mode. For example, this percentage could be about 90%. At that point, the continuous motion of actuator 232 is preferably stopped by communicating appropriate "stop" motion command signals to motion controller 262. Notably, the stop command is not necessarily a "hard stop" in which the servo motor is brought to a dead stop; rather, the stop command of the Continuous Move module 280 of DSP 254 preferably further decelerates the servo motor via appropriate motion command signals to bring, in this case, the probe to a controlled stop. Notably, a hard stop would be the fastest, but also risks damaging the SPM axis system. The preferred stop is the fastest stop that the SPM axis system can command while staying within the torque limits of the SPM axis stage servo motor. Preferably, the commanded deceleration rate is about 21.2 mm/second^2 (SPM Axis acceleration & deceleration are set in a parameter file that is specific to the SPM axis actuator, not determined by the DSP or the fast engage algorithm). From a maximum velocity of 1000 um/second, such a rate of deceleration would result in 47 um of "braking distance." However, the algorithm is designed to start decelerating to a slower velocity before the 'sewing trigger' is tripped.

In sum, the fast approach continues until $RMS_{err}$ starts to approach a deceleration trigger, at which point SPM axis stage deceleration begins. When $RMS_{err}$ drops below a sewing trigger RMS level, SPM axis stage is commanded to stop as fast as possible (by DSP sending a 'stop' command to the Galil, which oversees the gradual and then rapid deceleration of the SPM stage), and the Z piezo actuator is retracted (by the DSP sending Z piezo commands to the microscope controller, which generates and sends the analog high voltage signal to the Z piezo actuator.

With the stop command output by module 286, module 286 also transmits a "command type" instruction signal to switch 278. In response, switch 278 directs control of the rapid engage algorithm to the command type "Step Mode" module 290.

In sum, the above-described continuous move of the rapid engage algorithm brings the probe-sample separation from an initial separation or distance "D" (FIG. 9) such as 1 mm (for example, when the probe assembly is inserted into the SPM head) to a probe-sample separation typically less than about 100 microns, and preferably, less than 50 microns. Even more preferably, after the deceleration and ultimate stop of servo motor 232 (FIG. 9), the probe-sample separation is less than about 30 microns.

When control is yielded to the command type "Step Mode" in response to the $RMS_{err}$ meeting the trigger to stop the servo motor in the Continuous Mode, step mode module 290 of DSP 254 initially determines whether the second actuator (i.e., the Z-piezoelectric actuator 228 of the X-Y-Z scanner 224) is fully extended in instruction block 292. At this point, the answer should be "yes" given that the continuous move is performed with feedback "on" and the corresponding probe-sample interaction is not significant enough to retract Z-piezo 228, i.e., feedback operates to extend the actuator until the corresponding setpoint is reached (i.e., tip-sample engagement). In other words, because the setpoint typically will not be reached in the Continuous Mode, the actuator 228 remains extended in the Continuous Mode. If the second actuator 228 is extended, the second actuator is then retracted by appropriately modifying the Z-piezo drive voltage signal (DSP module 293, preferably turning feedback off and then retracting, which can take about 20 ms), and a Motion Command Signal is ultimately transmitted to the SPM motor motion controller via the motion controller communication interface or module 296 to step the servo motor a selected distance.

Preferably, the tip-sample separation "D" is reduced by at least two micron steps and more preferably four micron steps using servo motor 232 with the Z-piezo 228 being retracted in the Step Mode. Although four micron steps are preferred, the key is that the SPM step size is smaller than the Z piezo actuator's range of motion. Four microns, or 50% of a 8 um Z-piezo actuator 228, can be nominally chosen, but a larger range Z piezo actuator would allow for a larger SPM step size, in this case, using actuator 232. More particularly, once the second actuator is retracted and the first actuator is stepped, module 294 operates to enable SPM feedback (see SPM Feedback Enabled module 298) and determine whether the probe is engaged. At this point, an appropriate Motion Command Signal instructs the motion controller to "wait" and hold the servo motor 232 while feedback control is used to traverse the range of the second actuator (Z piezoelectric actuator 228) until an appropriate parameter of the oscillation of the probe meets the setpoint, i.e., until the probe and sample are engaged. In the event that the second actuator fully extends (feedback on) without detecting engagement between the probe and the sample, the command type Step Mode instruction module 290 again answers "yes" to instruction block 292, thus causing the algorithm to retract the Z-piezo as described previously and further step the first actuator (i.e., SPM servo motor 232) according to user-defined parameters. This process of stepping the first actuator and retracting the second actuator, and thereafter extending the second actuator to "seek out" the sample surface is repeated until the probe is ultimately engaged with the sample, and sometimes is referred to as "sewing."

With respect to feedback operation, when DSP 254 determines that the second actuator is retracted and then SPM feedback is enabled (block 298), SPM Feedback module 300 processes the $RMS_{err}$ signal. $RMS_{err}$ is transmitted to an integrator 302 of module 300 which outputs a "Z Command" signal to control the second actuator (Z-piezo actuator 228). Typically, a gain is applied to the $RMS_{err}$ signal by integrator 302 to generate a Z Command signal that causes, in this case, the probe to move downwardly toward the sample in an effort to cause tip-sample interaction characterized by a parameter of probe oscillation being substantially equal to the setpoint.

In addition, an adaptive gain stage 304 is preferably provided to intelligently modify the gain to efficiently bring the probe into engagement with the sample with little risk of damaging the sample. More particularly, as probe-sample interaction increases, such that the $RMS_{err}$ signal becomes smaller and oscillation nears the setpoint, the standard gain applied in conventional SPM feedback control systems may cause the probe-sample separation to narrow too much (i.e., beyond the setpoint), thus potentially causing damage to the tip and/or sample. To obviate this potential problem, adaptive gain module 304 applies a smaller gain as the $RMS_{err}$ signal becomes smaller to make sure that the probe is not slammed into the sample surface. The "triggers" for reducing the gain instructed by module 304 are preferably selected percentages that are compared to the $RMS_{err}$, similar to the triggers employed in Continuous Move Module 280 described previously.

In operation, once the Z Command Signal is generated, it is transmitted to SPM controller 240 which converts the signal to an analog signal (i.e., a Z-piezo drive voltage) that is applied to second actuator 228.

In sum, by utilizing a direct communication link, such as a parallel digital COM bus 264 (FIG. 9), between DSP 254 and motion controller 262, Continuous Move module 280 of DSP 254 can generate and communicate Motion Command signals in a more deterministic manner without the inherent limitations of the operating system software of host computer 250. As such, unlike previous methods of engaging the probe and sample, the continuous move portion of the engage algorithm reduces a large portion (for example, as much as 95% or more) of the typical initial probe-sample separation (e.g., 1 mm) to a safe amount, sometimes referred to herein as the Step Mode separation, very quickly. This Step Mode separation is much smaller than previously attainable (about 30 microns, for example) in good part because the rapid engage algorithm, and the corresponding architecture, of this preferred embodiment continually feeds back on the RMS amplitude of the oscillating probe such that the probe-sample interaction is always known during this continuous, high speed portion of the engage process. Again, it should be noted that the engage algorithm of the preferred embodiments is automatic such that it does not require the user to manually reduce the probe-sample separation to a secondary or safe distance. As highlighted previously, performing a manual step as part of the engage process to reduce the separation to a safe, yet very close separation (for example, less than about 20 microns) in preparation for a subsequent automatic engage operation is a laborious and time-consuming task, and thus prevents the user from being able to achieve the engage times contemplated by the present preferred embodiments. Typically, therefore, the initial separation as used herein is greater than 20 microns, and more often greater than 100 microns, and even more typically about 1 mm, a typical separation once the probe is mounted in the SPM head.

An illustration of the operation of the system shown in FIGS. 9 and 10 and described above is shown in FIG. 11. In particular, dashed line "A" illustrates the drive to the second actuator (i.e., the drive to the Z piezoelectric actuator 228) as probe-sample separation is decreased. The corresponding amplitude response of the oscillating probe is illustrated by the curve marked "B." The drive voltage to the Z-piezoelectric actuator 228 (the second actuator) is held constant at an amplitude $A_d$ during the continuous move portion of the algorithm (second actuator fully extended), and as the probe and sample begin to interact, the rapid engage algorithm begins to decelerate the SPM servo motor at a trigger $t_1$ (corresponding to trigger "trig1" of module 280), i.e., when the amplitude of oscillation reaches a predetermined percentage of the amplitude of free air oscillation. As the RMS amplitude decreases further along curve "B," the drive to the SPM motor will be further decelerated at triggers $t_2$ and $t_3$. Thereafter, when the RMS amplitude reaches a stop trigger, $t_s$, the speed of the SPM servo motor is further reduced by communicating appropriate (preferably, decelerating) control signals to controller 262 until the SPM motor stops. In addition, at that point, control is yielded to the command type Step Mode in which the second actuator (i.e., Z-piezoelectric actuator) is retracted and the servo motor is stepped down, as described previously. Thereafter, the servo motor is used to step the probe towards the sample in discrete steps as the second actuator is thereafter extended through its range in an attempt to achieve probe oscillation at the setpoint, indicated as the "Amplitude Setpoint" in FIG. 11. Again, the "Amplitude Setpoint" corresponds to probe-sample engage.

Figure 12:
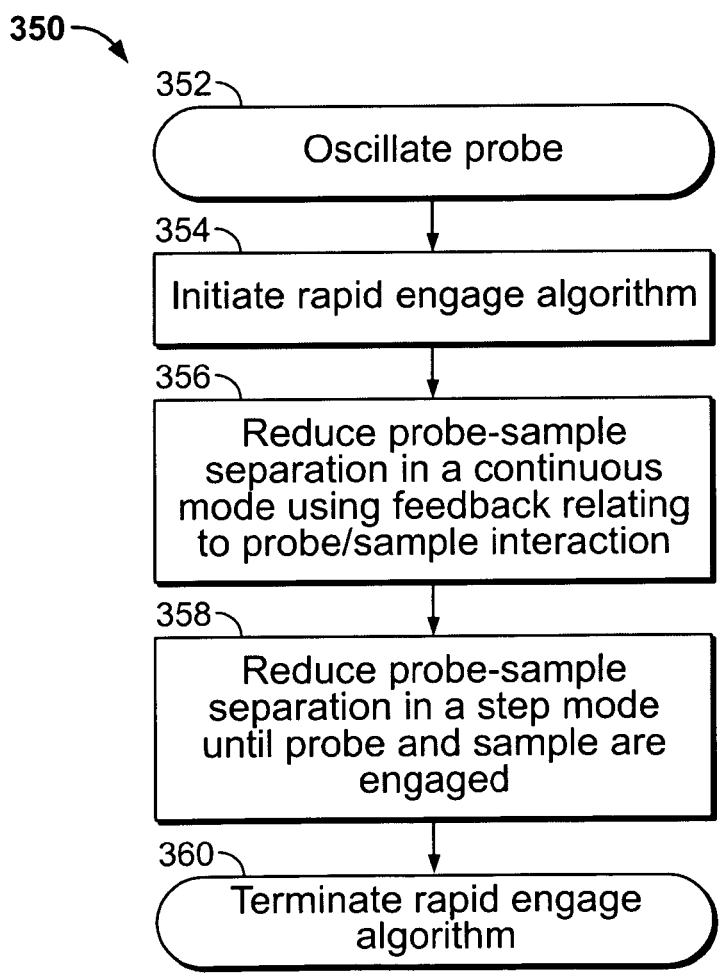
FIG. 12 is a flow chart illustrating a method of rapidly engaging an SPM probe with a sample using the SPM of FIGS. 9 and 10.
Figure 13A:
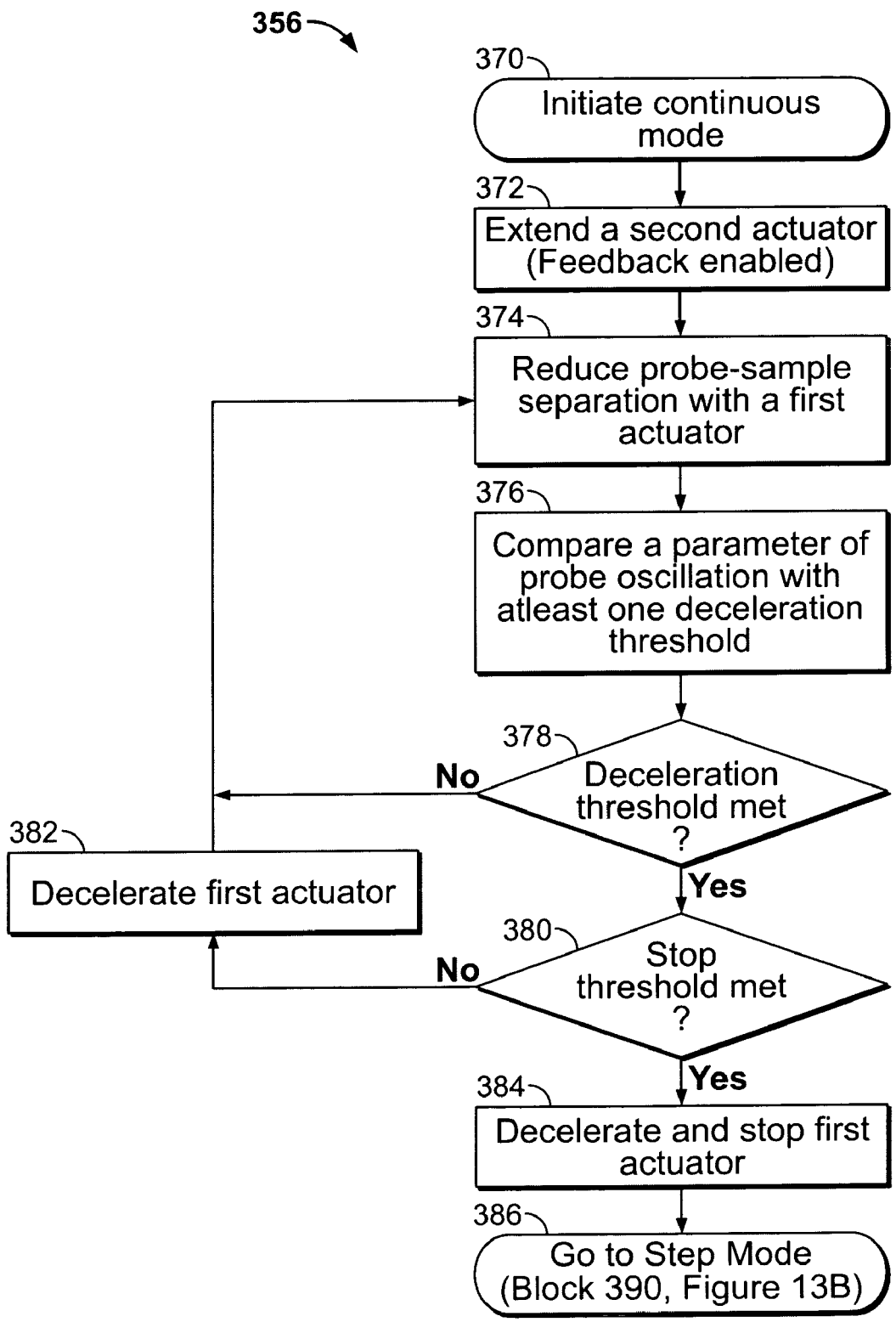
FIG. 13a is a flow chart of the Continuous Mode portion of the rapid engage algorithm of FIG. 12.
Figure 13B:
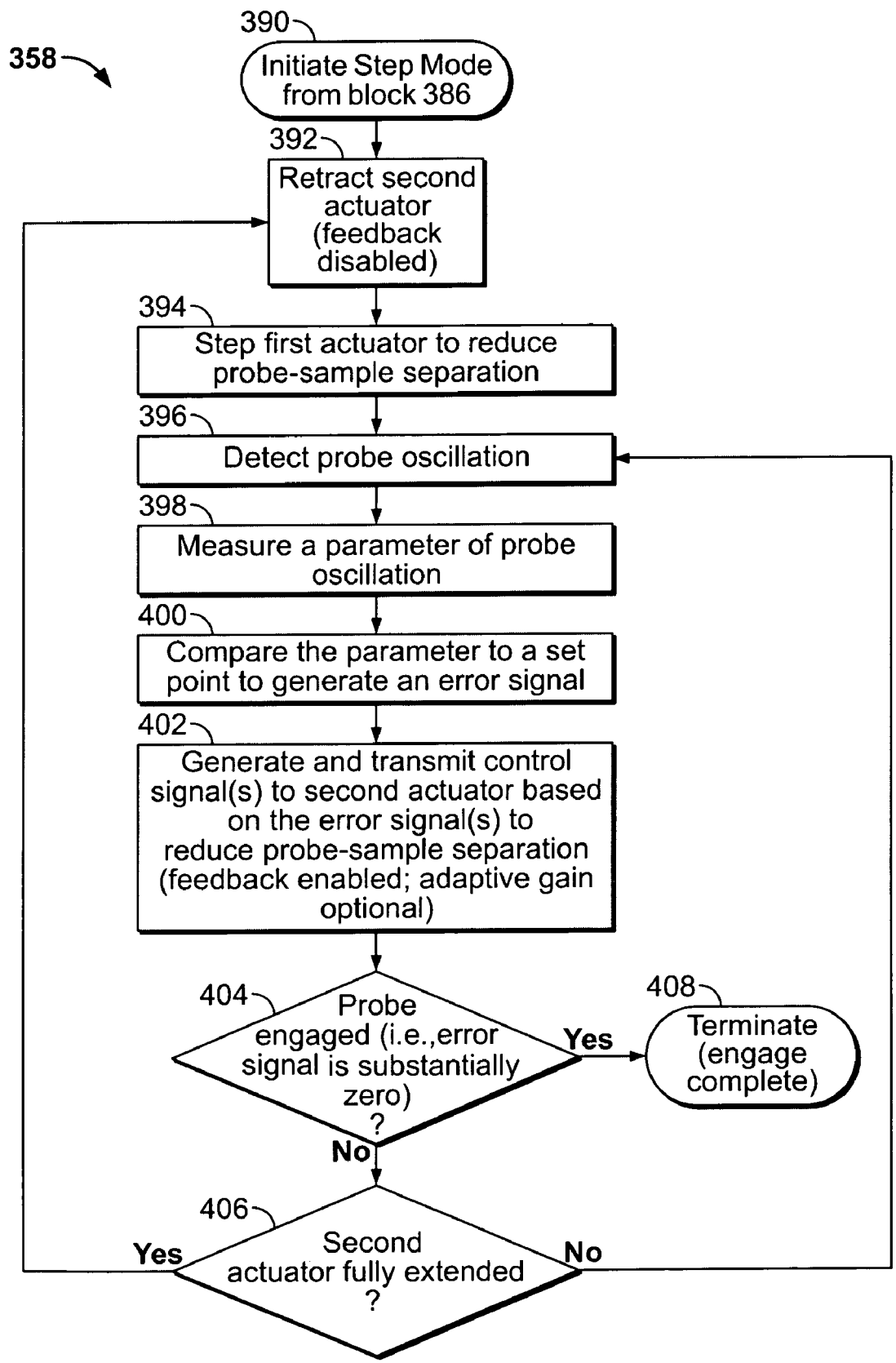
FIG. 13B is a flow chart illustrating the Step Mode portion of the rapid engage algorithm of FIG. 12.

The automatic engage algorithm is further illustrated generically in FIG. 12, and in detail in FIGS. 13A and 13B. Initially, in FIG. 12, rapid engage algorithm 350 includes oscillating the probe from an initial separation that does not reflect manually reducing the separation to some small range, such as less than 20 microns, at Block 352 and then initiating the rapid engage algorithm at Block 354. Thereafter, in Block 356, probe-sample separation is reduced using the Continuous Mode command type. Again, by using feedback regarding probe-sample interaction during this high speed move, damage to the probe and/or sample is minimized. In particular, the high speed move is slowed until the probe-sample separation reaches a safe separation known as the Step Mode separation. At that point, the DSP directs control to Block 358 in which probe-sample separation is further reduced in Step Mode until the probe and sample are engaged. Once engaged, the rapid engage algorithm is terminated in Block 360. The details of each of the modes of the rapid engage algorithm are described further in FIGS. 13A and 13B, respectively.

The Continuous Mode algorithm 356 of the rapid engage method 350 is illustrated in FIG. 13A. Initially, Continuous Mode is initiated at Block 370 to begin automatically reducing the probe-sample separation from an initial separation typically more than 20 microns, with no preparation or set up by manually reducing the tip-sample separation to a safe amount, such as 20 microns or less. At that point, the second actuator, such as the Z-piezoelectric actuator 228 of the X-Y-Z scanner 224, is extended. This is preferably accomplished by enabling a feedback loop (300 in FIG. 10) in Block 372. Then, in Block 374, probe-sample separation is reduced with the first actuator, e.g., the SPM servo motor 232, preferably at a selected speed such as about 850 microns/second. While probe-sample separation is reduced, algorithm 356 compares a parameter of probe oscillation with at least one of a number of deceleration thresholds in Block 376. To do so, the oscillation of the probe is detected with, for example, a photo detector which generates and transmits a corresponding signal to the SPM controller that generates an error signal ($RMS_{err}$) that is compared to the deceleration threshold(s). Then, in Block 378, the method determines whether and which deceleration threshold has been met. If none of the deceleration thresholds have been met control is returned to Block 374 to further reduce probe-sample separation at the selected speed with the first actuator.

Once a deceleration threshold has been met, the method 356 determines whether the stop threshold has been met in Block 380. If not, the appropriate threshold trigger is determined and the first actuator is decelerated in Block 382 and control is directed back to Block 374 to further reduce probe-sample separation to (and possibly decelerate the first actuator further) as the algorithm attempts to narrow the probe-sample separation to the Step Mode separation. In that regard, if the stop threshold has been met, the first actuator is decelerated and brought to a stop at Block 384 via appropriate motion control signals. Control is then yielded to the Step Mode in Block 386. Step Mode is illustrated in FIG. 13B.

In FIG. 13B, the Step Mode is initiated at Block 390 at which point the Step Mode algorithm 358 fully retracts the second actuator (e.g., Z-piezoelectric actuator 228) in Block 392, typically with feedback disabled. Notably, although described as part of the Step Mode, this retraction may be completed upon determining that the probe-sample interaction meets the "stop" threshold in the Continuous Mode.

As second actuator 228 is being retracted, algorithm 358 preferably simultaneously steps the first actuator (e.g., the SPM servo motor 232) to reduce probe-sample separation by a selected amount in Block 394. In Block 396, probe oscillation is detected preferably using the above-described beam-bounce optical detection scheme, and then a parameter of the probe oscillation is measured in Block 398. The parameter is then compared to a setpoint to generate an error signal, $RMS_{err}$, in Block 400. Based on the error signal, the method 358 generates and transmits a control signal to the second actuator to reduce probe-sample separation in Block 402. In Block 404, the algorithm determines whether the probe is engaged, which conventionally means that the error signal $RMS_{err}$ is substantially zero. If so, Block 408 terminates algorithm 350 given that the engage operation is complete. If, on the other hand, the probe is not engaged, method 358 determines whether the second actuator is fully extended in Block 406. If not, that provides an indication that the full range of the second actuator has not been traversed, and the feedback loop repeats Blocks 396 to 406 to attempt to engage the probe with the sample. Notably, algorithm 358, and more particularly Block 402, preferably includes the adaptive gain function described above. In that regard, prior to executing Block 404, algorithm 358 determines whether the error signal is becoming smaller. More particularly, the error signal is compared to one or more adaptive gain thresholds and if one is met, the algorithm appropriately reduces the gain applied to generate the Z-piezo drive signal to further minimize the chance that either the probe or the sample becomes damaged during the engage process.

If the second actuator becomes fully extended as determined by Block 406, control is sent back to Block 392 to retract the second actuator and simultaneously step the servo motor to the next position (2 or 4 microns, e.g.). Method 358 is executed until the probe is engaged at which point the algorithm is terminated in Block 408. In sum, algorithm 350 is able to automatically perform the probe-sample engage in 3-10 seconds, or less, without damaging the tip and/or sample.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. The scope of still other changes to the described embodiments that fall within the present invention but that are not specifically discussed above will become apparent from the appended claims.

What is claimed is:

1. A method of engaging a probe with a sample surface, the method comprising:

automatically reducing the spacing between a probe of a scanning probe microscope and a sample from an initial separation to one in which the probe is in an engaged position in less than about ten (10) seconds by detecting the spacing using the interaction between the probe and the sample without using a proximity sensor separate from the probe; and wherein the initial separation is a vertical distance between a tip of the probe and the sample surface when the tip is first moved to a region of interest of the sample.

2. The method of claim 1, further comprising the steps of:
oscillating the probe;
measuring at least one parameter of probe oscillation; and
wherein said reducing step includes generally continuously controlling said reducing step based on said measuring step to reduce the spacing from the initial separation to the engaged position.

3. The method of claim 2, wherein said reducing step is performed in substantially real-time with said measuring step.

4. The method of claim 2, wherein said automatically reducing step is performed in less than about 5 seconds.

5. The method of claim 3, wherein said reducing step includes a first reducing step and a second reducing step, wherein said first reducing step is performed at a higher speed than said second reducing step.

6. The method of claim 5, wherein said first reducing step generally continuously reduces the spacing.

7. The method of claim 5, wherein said first reducing step is performed at a speed greater than about 600 microns/second.

8. The method of claim 5, wherein said second reducing step reduces the spacing in one or more discrete steps.

9. The method of claim 8, wherein said second reducing step includes stepping a linear actuator and thereafter moving a Z-axis actuator.

10. The method of claim 9, wherein the linear actuator is a servo motor coupled to a screw and nut arrangement.

11. The method of claim 9, wherein the Z-axis actuator is a piezo electric actuator.

12. The method of claim 9, wherein the linear actuator is coupled to the probe.

13. The method of claim 9, wherein the Z-axis actuator is retracted after each step of stepping the linear actuator, and said moving step includes extending the Z-axis actuator.

14. The method of claim 13, wherein, during said extending step, said controlling step includes using a feedback loop to generate a control signal based on said measuring step, the control signal being used to control said extending step, and wherein said extending and said using steps are repeated until either (1) the Z-axis actuator is fully extended, or (2) the parameter of oscillation substantially corresponds to a setpoint.

15. The method of claim 14, further comprising turning off the feedback loop and repeating said stepping the linear actuator if the Z-axis actuator is fully extended.

16. The method of claim 14, wherein the feedback loop generates an error signal in response to said measuring step, and further comprising applying a gain to the error signal to generate the control signal, and wherein the gain is applied by an adaptive gain stage that varies the gain based on the error signal.

17. The method of claim 16, wherein the gain is an integral gain.

18. The method of claim 16, wherein the gain is reduced as the error signal becomes smaller.

19. The method of claim 9, wherein said stepping the linear actuator step includes stepping the linear actuator more than 2 microns.

20. The method of claim 19, wherein the linear actuator is stepped at least about 4 microns.

21. The method of claim 8, wherein the at least one parameter is the RMS amplitude of probe oscillation.

22. The method of claim 6, further comprising the step of decelerating a speed of said first reducing step in response to an output of said measuring step meeting a trigger threshold.

23. The method of claim 22, wherein the trigger threshold corresponds to a percentage of the at least one parameter corresponding to the probe oscillating in free air.

24. The method of claim 22, wherein said first reducing step includes using an actuator responsive to said decelerating step.

25. The method of claim 24, wherein the actuator is a linear actuator.

26. The method of claim 25, wherein the linear actuator includes a servo motor that drives a screw and nut arrangement, and wherein at least some part of the linear actuator is coupled to the probe.

27. The method of claim 24, further comprising the steps of generating an error signal in response to said measuring step, processing the error signal to generate a control signal and directly communicating the control signal to a motion controller coupled to the actuator.

28. The method of claim 27, wherein a processor of a host computer generates the control signal, the control signal being communicated directly to the motion controller via a dedicated communication line without processing by host software of the host computer.

29. The method of claim 23, wherein said decelerating step is performed in response to a plurality of trigger thresholds each corresponding to a selected percentage of the at least one parameter of the probe oscillating in free air, and each threshold corresponding to an associated amount of deceleration.

30. The method of claim 29, wherein the at least one parameter is the RMS amplitude.

31. The method of claim 29, wherein one of the trigger thresholds is an SPM stop threshold, and further comprising the step of stopping said first reducing step when the output of said measuring step meets the stop threshold.

32. The method of claim 31, wherein said stopping step is not a hard stop.

33. The method of claim 31, further comprising retracting a Z-axis actuator in response to said stopping step.

34. The method of claim 1, wherein the initial separation is greater than 20 microns.

35. The method of claim 34, wherein the initial separation is greater than 500 microns.

36. The method of claim 1, wherein the probe is a critical dimension probe.

* * * * *